US008837397B2

(12) United States Patent
Zheng

(10) Patent No.: US 8,837,397 B2
(45) Date of Patent: Sep. 16, 2014

(54) APPARATUS AND METHOD FOR CO-EXISTENCE BETWEEN DIFFERENT RADIO ACCESS TECHNOLOGIES

(75) Inventor: Yan-Xiu Zheng, Shulin (TW)

(73) Assignee: Industrial Technology Research Institute, Taiwan (CN)

(*) Notice: Subject to any disclaimer, the term of this patent is extended or adjusted under 35 U.S.C. 154(b) by 596 days.

(21) Appl. No.: 13/163,265

(22) Filed: Jun. 17, 2011

(65) Prior Publication Data

US 2012/0033589 A1 Feb. 9, 2012

Related U.S. Application Data

(60) Provisional application No. 61/371,945, filed on Aug. 9, 2010, provisional application No. 61/372,375, filed on Aug. 10, 2010, provisional application No. 61/406,330, filed on Oct. 25, 2010.

(51) Int. Cl.
*H04W 4/00* (2009.01)
*H04W 99/00* (2009.01)
*H04W 8/00* (2009.01)
*H04W 88/06* (2009.01)

(52) U.S. Cl.
CPC .............. *H04W 99/00* (2013.01); *H04W 8/005* (2013.01); *H04W 88/06* (2013.01); *H04W 28/183* (2013.01)
USPC .......................................................... 370/329

(58) Field of Classification Search
CPC .............................. H04W 4/00; H04W 72/042
USPC .................................... 370/280, 281, 315, 329
See application file for complete search history.

(56) References Cited

U.S. PATENT DOCUMENTS

| 8,509,124 B2 * | 8/2013 | Lim et al. ....................... 370/281 |
| 2010/0124184 A1 * | 5/2010 | Dayal et al. .................... 370/280 |
| 2011/0268016 A1 * | 11/2011 | Youn et al. ..................... 370/315 |

* cited by examiner

*Primary Examiner* — Mark Rinehart
*Assistant Examiner* — Gbemileke Onamuti
(74) *Attorney, Agent, or Firm* — Alston & Bird LLP

(57) ABSTRACT

Apparatuses and methods are provided for co-existence between different first and second radio access technologies (RATs). The apparatus is configured or caused to perform operations, which the method may include. The operations may include selecting parameter(s) of a frame structure of the first RAT so as to facilitate its co-existence with the second RAT. These parameters may include a given length of a cyclic prefix of subframe(s) of the first frame structure, or the types of subframes of which the first frame structure is composed. The operations may additionally or alternatively include selecting, for the first RAT, the uplink and/or downlink duration(s) and/or transmit transition gap therebetween so as to satisfy a number of conditions that may define co-existence between the first and second RATs. Further, the operations may additionally or alternatively include structuring cyclic prefixes of the frame structures of the first RAT to reduce network search complexity.

4 Claims, 19 Drawing Sheets

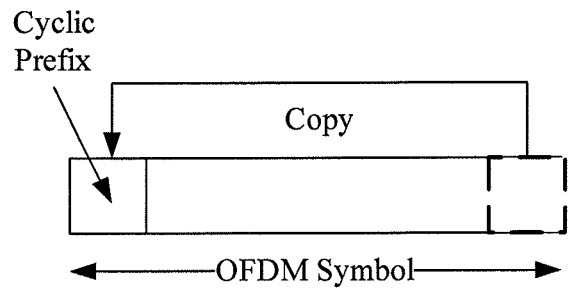
FIG. 7
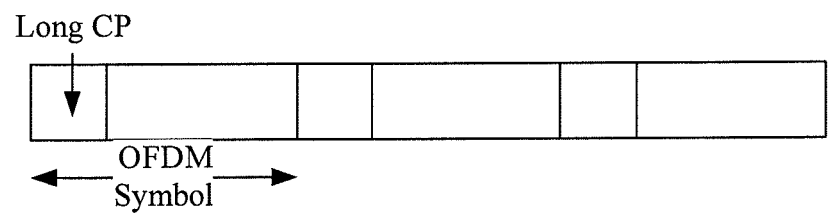
FIG. 8

| Type 1 Subframe 6 OFDM symbols | Type 1 Subframe 6 OFDM symbols | Type 3 Subframe 5 OFDM symbols | Type 2 Subframe 7 OFDM symbols | Type 2 Subframe 7 OFDM symbols | Type 2 Subframe 7 OFDM symbols (sounding) |
|---|---|---|---|---|---|
| Type 1 Subframe 6 OFDM symbols | Type 1 Subframe 6 OFDM symbols | Type 3 Subframe 5 OFDM symbols | Type 2 Subframe 7 OFDM symbols | Type 2 Subframe 7 OFDM symbols | Type 2 Subframe 7 OFDM symbols |

FIG. 19

| Type 1 Subframe 6 OFDM symbols | Type 2 Subframe 7 OFDM symbols | Type 2 Subframe 7 OFDM symbols | Type 2 Subframe 7 OFDM symbols |
|---|---|---|---|

| Type 1 Subframe 6 OFDM symbols | Type 2 Subframe 7 OFDM symbols |
|---|---|

| Type 1 Subframe 6 OFDM symbols | Type 1 Subframe 6 OFDM symbols | Type 3 Subframe 5 OFDM symbols | Type 3 Subframe 5 OFDM symbols | Type 3 Subframe 5 OFDM symbols |
|---|---|---|---|---|

| Type 2 Subframe 7 OFDM symbols | Type 2 Subframe 7 OFDM symbols |
|---|---|

FIG. 20

APPARATUS AND METHOD FOR CO-EXISTENCE BETWEEN DIFFERENT RADIO ACCESS TECHNOLOGIES

CROSS-REFERENCE TO RELATED APPLICATIONS

The present application claims priority to U.S. Provisional Patent Application No. 61/371,945, entitled: Network Discover and Search Support for Multiple Frame Configurations With Different Cyclic Prefixes, filed on Aug. 9, 2010; U.S. Provisional Patent Application No. 61/372,375, entitled: Co-Existence Between WiMAX and TD-SCDMA-Frame Structure, filed on Aug. 10, 2010; and U.S. Provisional Patent Application No. 61/406,330, entitled: Co-Existence Between WiMAX and TD-LTE-Frame Structure, filed on Oct. 25, 2010, the content of all which is incorporated herein by reference.

FIELD

Example embodiments generally relate to operation of a wireless network, and more particularly, relate to facilitating co-existence between different radio access technologies.

BACKGROUND

A heterogeneous communications system may include one or more public land mobile networks each of which includes a core network backbone. Each core network, in turn, may be coupled to one or more radio access networks (RANs) that implement one or more radio access technologies (RATs). A number of these radio access technologies may include Time Division Duplexing (TDD), which may require aligning the timing of the downlink (DL) and uplink (UL) with other similar radio access technologies on adjacent carriers. Examples of radio access technologies that may employ TDD include WiMAX (IEEE 802.16) and its next generation Mobile WiMAX Release 2 (IEEE 802.16m), Time Division Synchronous Code-Division Multiple Access (TD-SCDMA), Time Division Long Term Evolution (TD-LTE) or the like. FIG. 1 illustrates an example Time Division Long Term Evolution (TD-LTE) or the like. FIG. 1 illustrates an example of a portion of two radio access networks implementing different radio access technologies that are unaligned. As shown, each radio access network includes a respective base station (BS), BS1 (e.g., TD-LTE) and BS2 (e.g., Mobile WiMAX Release 2). As shown, BS1 DL overlaps BS2 UL. In general, the BS transmission power may be 43 dBm, and the mobile station (MS) transmission power may be 23 dBm. Although both BSs are on adjacent carriers, the BS transmission power may be at least 20 dBm greater than that of the MS, which may cause at least 20 dB of adjacent carrier interference (ACI) between the BS1 DL and BS2 UL.

SUMMARY

In light of the foregoing background, exemplary embodiments of the present disclosure provide frame structures for a first radio access technology (e.g., IEEE 802.16, IEEE 802.16m) that may co-exist with at least one second, different radio access technology (e.g., TD-SCDMA, TD-LTE). Exemplary embodiments may also provide associated frame structures for reducing cell search complexity in a radio access network implementing the first radio access technology. One exemplary embodiment applies cyclic prefixes not 1/8 or 1/16 to adjust the timing relationship between the first and second radio access technologies. Another exemplary embodiment applies different Advanced Air Interface (AAI) subframe types to fit the timing relationship between the first and second radio access technologies so as to avoid interference. Exemplary embodiments may provide design criteria for the frame structure. Exemplary Orthogonal Frequency Division Multiplex (OFDM) symbols may also be provided based on the analysis. Due to the application of different cyclic prefix lengths (durations), exemplary embodiments may provide an approach to reduce network search complexity.

According to exemplary embodiments of the present disclosure, an apparatus and method are provided. The apparatus includes a processor configured to perform or cause the apparatus to perform a number of operations (or functions), and the method includes a number of operations. The operations include preparing for transmission or receiving data from a base station to or at a mobile station, where the data is formatted in frames of a first frame structure of a first radio access technology that may apply time division duplexing. The first frame structure is composed of seven or eight subframes including subframes allocated to an uplink and subframes allocated to a downlink. The subframes each include a cyclic prefix of a given length, and are of a type of subframe selected from a plurality of types of subframes each of which includes a respective number of symbols.

One or more parameters of the first frame structure are selected based on a second frame structure of a second, different radio access technology that may apply time division duplexing. Similar to the first frame structure, the second frame structure also includes subframes allocated to an uplink and subframes allocated to a downlink.

The parameter(s) include the given length of the cyclic prefix of each of one or more of the subframes of the first frame structure, or the types of subframes of which the first frame structure is composed. And the parameter(s) are selected to align switching points between the uplink and downlink subframes of the first frame structure with switching points between the uplink and downlink subframes of the second frame structure.

According to other exemplary embodiments of the present disclosure, an apparatus and method are provided. The apparatus includes a processor configured to perform or cause the apparatus to perform a number of operations (or functions), and the method includes a number of operations. The operations of these exemplary embodiments include preparing for transmission or receiving data from a base station to or at a mobile station. The data is formatted in frames of a first frame structure of a first radio access technology that applies time division duplexing and supports a given round trip delay (RTD) between the base station and mobile station. The first frame structure is composed of subframes allocated to an uplink and subframes allocated to a downlink, where the uplink and downlink subframes of the first frame structure having respective durations $U_1$ and $D_1$ and being separated by a transmit transition gap (TTG).

One or more of $U_1$, $D_1$ or TTG are selected based on a second frame structure of a second, different radio access technology that applies time division duplexing. The second frame structure is also composed of subframes allocated to an uplink and subframes allocated to a downlink. The uplink and downlink subframes of the second frame structure have respective durations $U_2$ and $D_2$ and are separated by a guard period (G). In this regard, one or more of $U_1$, $D_1$ or TTG are selected to satisfy the following conditions: (a) $D_2+G/2>D_1+RTD/2$; (b) $U_2+G/2>U_1+RTD/2$; and (c) $RTD<TTG$.

According to yet other exemplary embodiments of the present disclosure, an apparatus and method are provided. The apparatus includes a processor configured to perform or cause the apparatus to perform a number of operations (or functions), and the method includes a number of operations. The operations of these exemplary embodiments include preparing for transmission or receiving data from a base station to or at a mobile station, where the data is formatted in frames of a frame structure selected from a plurality of frame structures of a radio access technology. The frame structures each include a preamble, and are each composed subframes allocated to an uplink and subframes allocated to a downlink. The preambles each include a cyclic prefix that is identical for the frame structures, and the subframes each include a cyclic prefix that is different for at least some of the frame structures.

For the radio access technology of these exemplary embodiments, a superframe header or a broadcast channel carries information indicating the selected frame structure and cyclic prefix of the subframes of the respective frame structure. The superframe header or broadcast channel includes a cyclic prefix that is identical to the cyclic prefix of the preambles of the frame structures.

For the data prepared for transmission or received in accordance with these other exemplary embodiments, the selected frame structure and cyclic prefix of the subframes of the respective frame structure are identifiable. In this regard, the selected frame structure and cyclic prefix are identifiable according to a process including detecting the preamble and estimating the cyclic prefix of the preamble, decoding the superframe header or broadcast channel based on the estimated cyclic prefix, and identifying the selected frame structure and cyclic prefix from the information carried by the superframe header or broadcast channel.

BRIEF DESCRIPTION OF THE DRAWINGS

Figure 1:
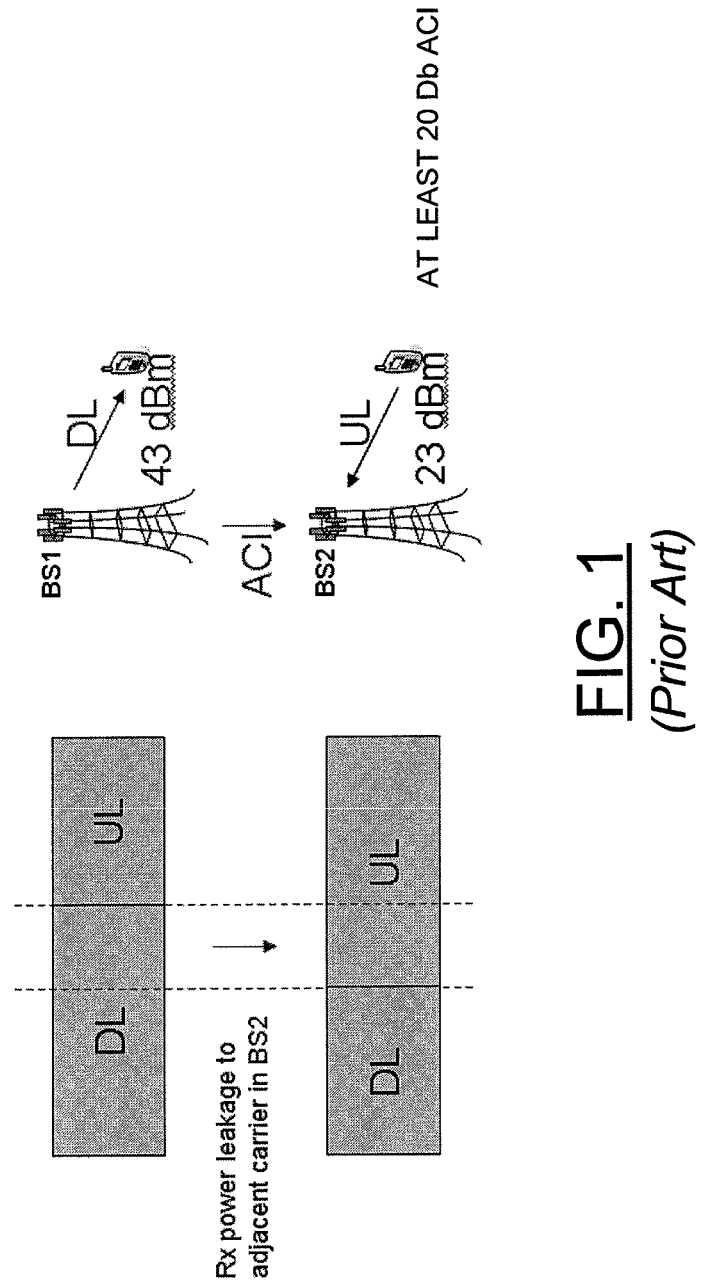
Figure 2:
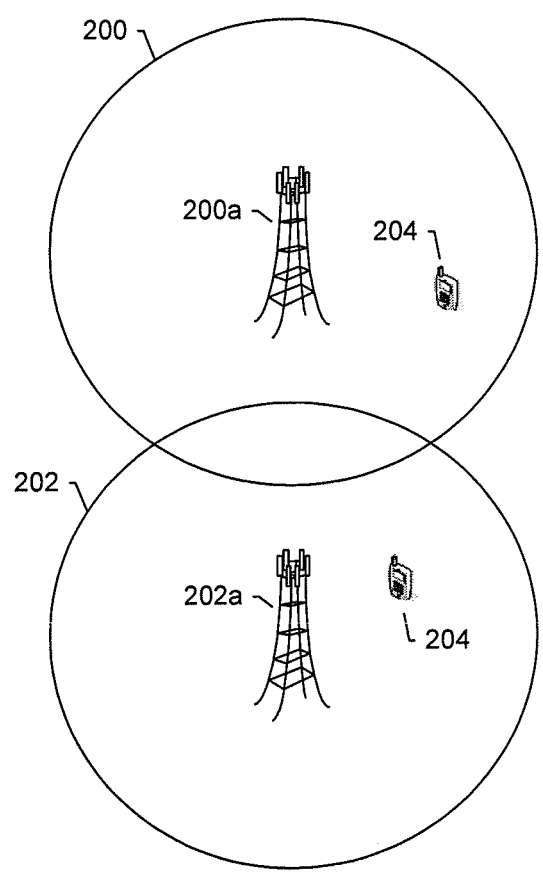
Figure 3:
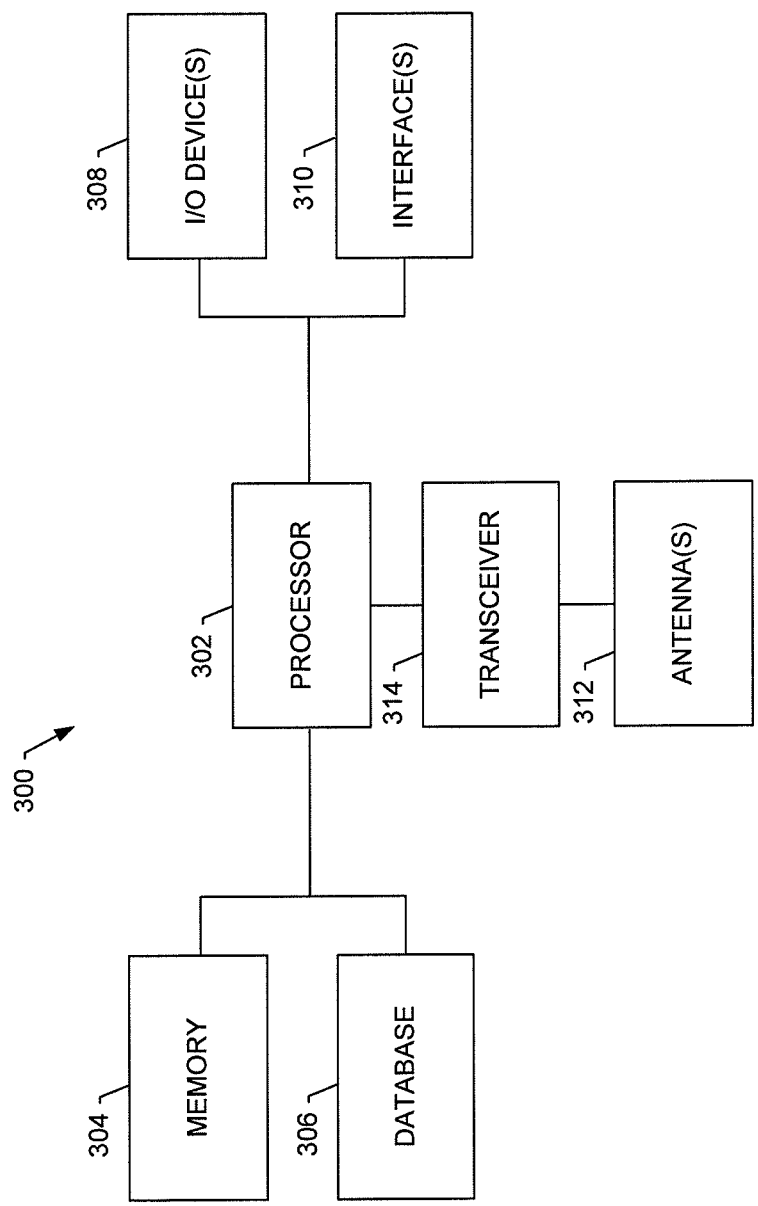
Figure 4:
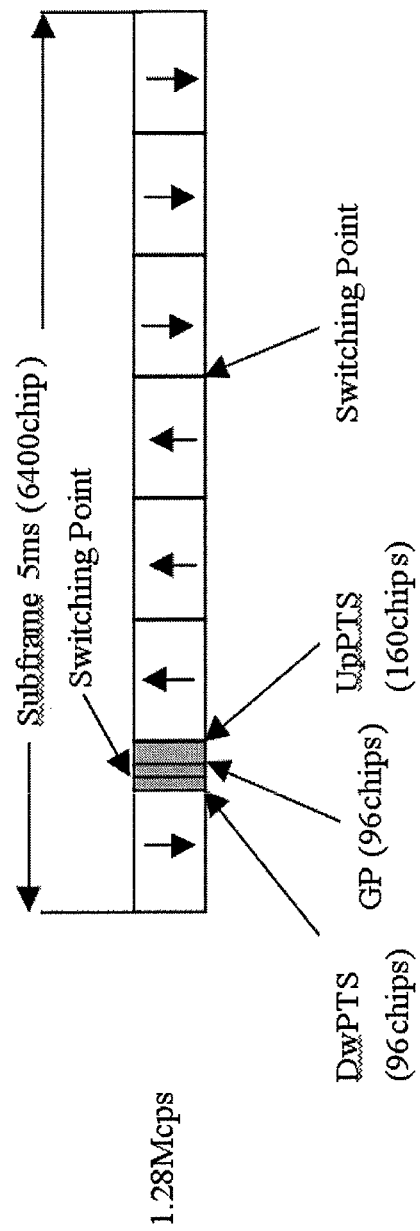
Figure 5:
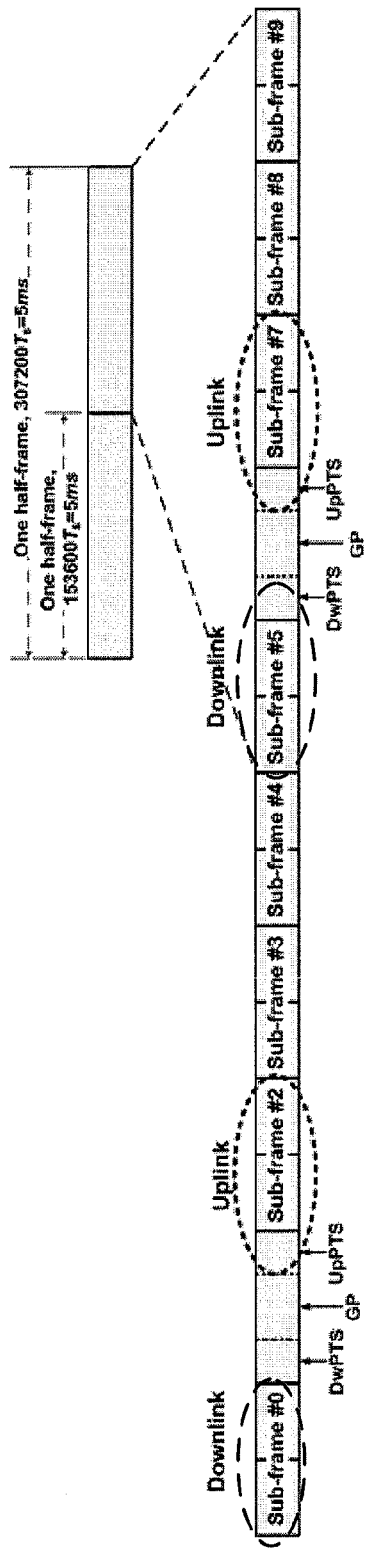
Figure 6:
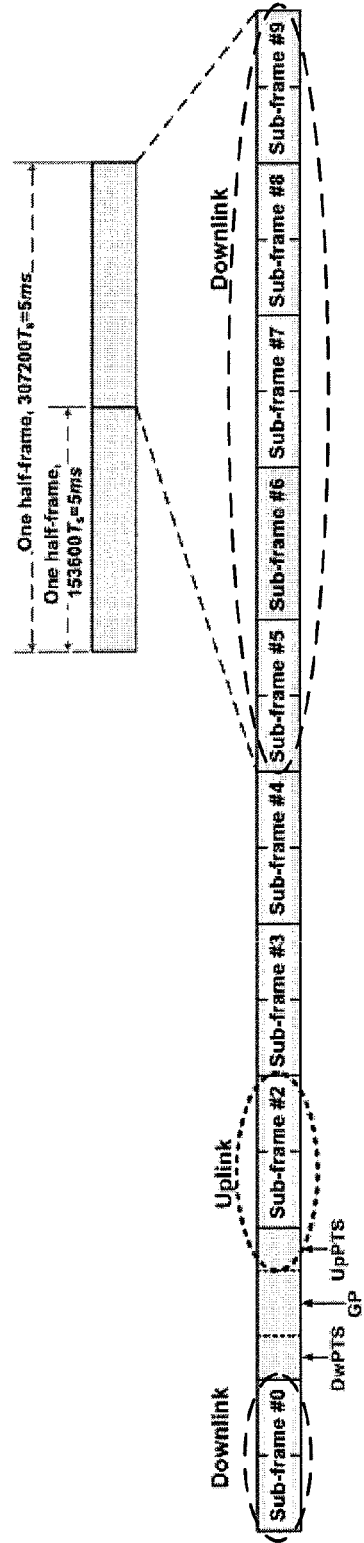
Figure 9:
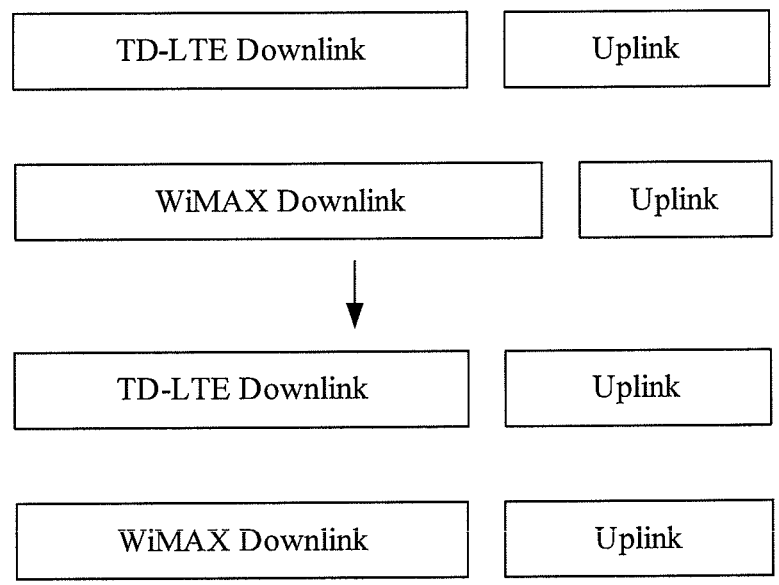
Figure 10:
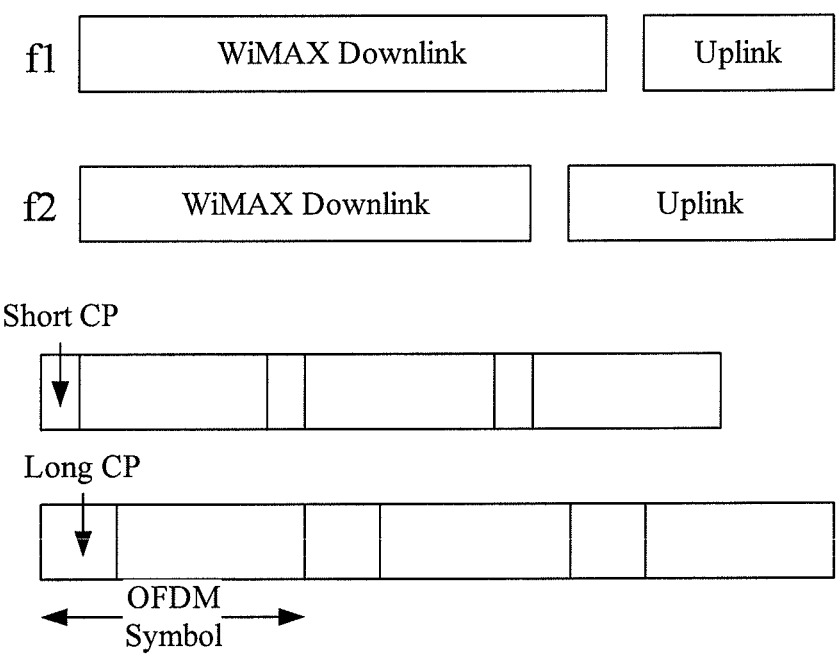
Figure 11:
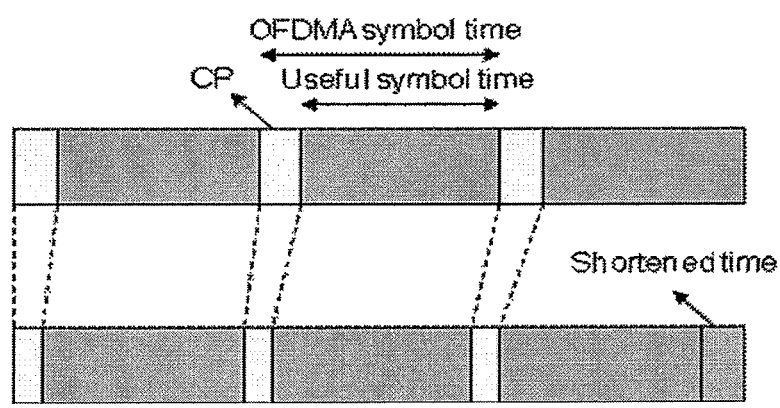
Figure 12:
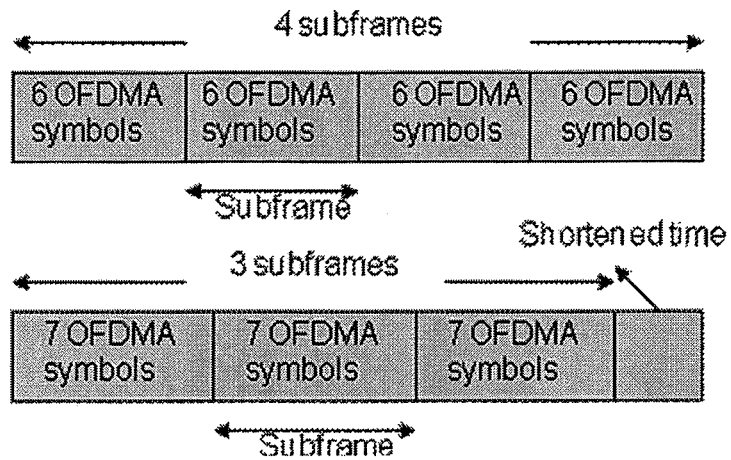
Figure 13:
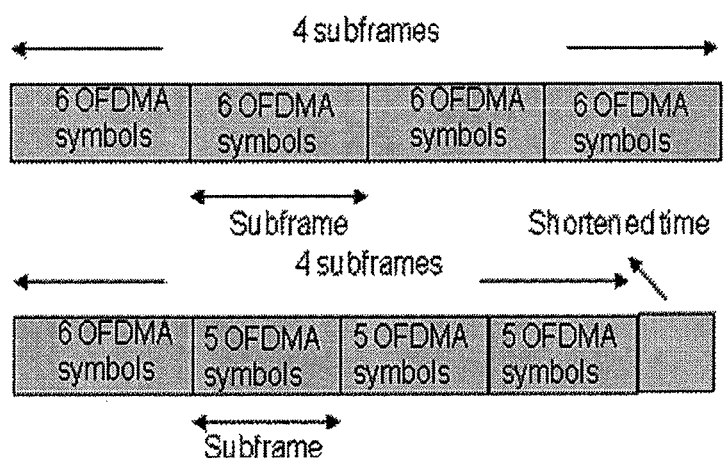
Figure 24:
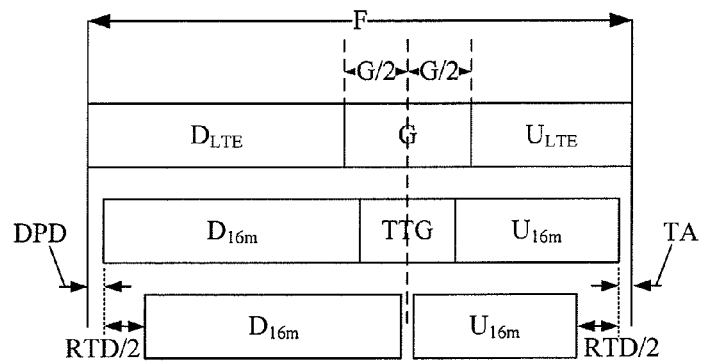
Figure 25:
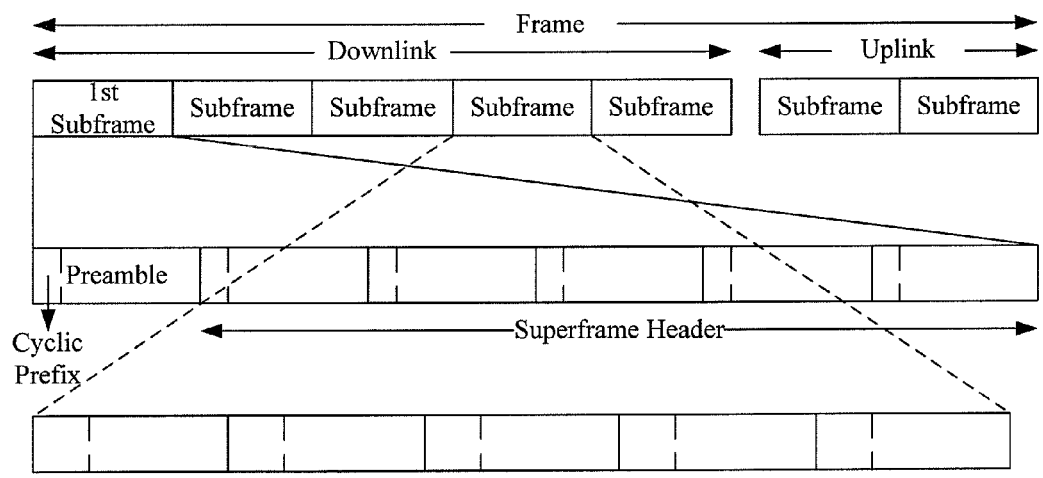
Figure 26:
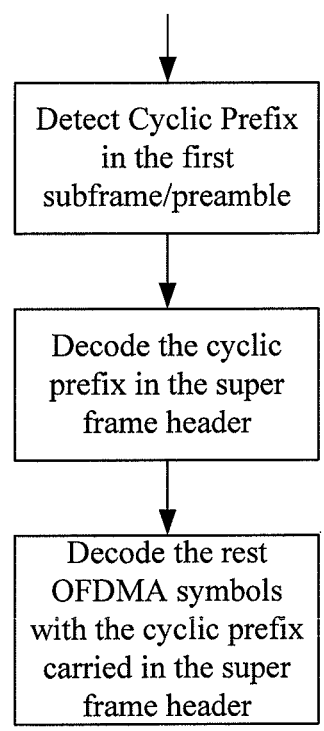

Having thus described the disclosure in general terms, reference will now be made to the accompanying drawings, which are not necessarily drawn to scale, and wherein:

FIG. 1 illustrates an example of a portion of two radio access networks implementing different radio access technologies that are unaligned;

FIG. 2 is a schematic block diagram illustrating components of a heterogeneous communications system according to one exemplary embodiment;

FIG. 3 is a schematic block diagram of an apparatus that may be configured to operate as a base station or mobile station, in accordance with exemplary embodiments;

FIG. 4 illustrates an exemplary frame structure according to Time Division Synchronous Code-Division Multiple Access (TD-SCDMA) frame structure;

FIGS. 5 and 6 illustrate two exemplary frame structures according to Time Division Long Term Evolution (TD-LTE);

FIG. 7 illustrates an exemplary Orthogonal Frequency Division Multiplex (OFDM) symbol in which the cyclic prefix is copied from the tail;

FIG. 8 illustrates two OFDM symbols of a radio access technology employing Orthogonal Frequency Division Multiple Access (OFDMA);

FIG. 9 illustrates applying different cyclic prefixes for WiMAX In order to align the timing between it and another radio access technology, according to exemplary embodiments;

FIG. 10 illustrates a frame structure including a different frame structure on two carriers, according to exemplary embodiments;

FIGS. 11-13 illustrate various manners according to which downlink and uplink timing may be adjusted, according to exemplary embodiments;

FIGS. 14-23 illustrate frame structures according to exemplary embodiments of the present disclosure;

FIG. 24 illustrates the timing relationship between TD-LTE and IEEE 802.16m according to one exemplary embodiment;

FIG. 25 illustrates a frame structure in an instance including a superframe header according to one exemplary embodiment; and FIG. 26 illustrates a flowchart with various operations in a method of detecting the preamble according to one exemplary embodiment.

DETAILED DESCRIPTION

Exemplary embodiments now will be described more fully hereinafter with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terms "data," "content," "information" and similar terms may be used interchangeably, according to some exemplary embodiments, to refer to data capable of being transmitted, received, operated on, and/or stored ("example," "exemplary" and like terms as used herein refer to "serving as an example, instance or illustration"). The term "network" may refer to a group of interconnected computers or other computing devices, which may be interconnected directly or indirectly by various means including via one or more switches, routers, gateways, access points or the like. As also described herein, various messages or other communication may be transmitted or otherwise sent from one component or apparatus to another component or apparatus. It should be understood that transmitting a message or other communication may include not only transmission of the message or other communication, but may also include preparation or otherwise generation of the message or other communication by a transmitting apparatus or various means of the transmitting apparatus. Further, although examples may be provided herein including parameters of particular values, it should be understood that the parameters need not exactly equal the respective values, but may instead be approximate to the values within acceptable error tolerances or design constraints.

FIG. 2 is a schematic block diagram illustrating components of a heterogeneous communications system according to one example embodiment. The communications system may include one or more public land mobile networks each of which includes a core network backbone. Each core network, in turn, may be coupled to one or more radio access networks including, as shown, a first radio access network 200 that implements a first radio access technology, and a second radio access network 202 that implements a second, different radio access technology. Each of the radio access networks 200, 202 includes one or more respective base stations (BSs) 200a, 202a for wireless communication with one or more mobile stations (MSs) 204 that may be compatible with either or both radio access network. Although other components of the communications system are not shown and described herein, it should be appreciated that the MS may be coupled to the system through a respective BS.

As described herein, for example, the first radio access technology may be first, second or higher generation WiMAX operating in a TDD mode. This radio access technology may at times be referred to herein as IEEE 802.16 or 802.16m, but it should be understood that the radio access technology may be defined by either of the noted standards or standards families, but may alternatively be defined by other appropriate standards. As also described herein, for example, the second radio access technology may be TD-SCDMA, TD-LTE of the like. It should be understood, however, that example embodiments may be applicable to other radio access technologies, such as those that implement the Orthogonal Frequency Division Multiple Access (OFDMA) modulation scheme. Although a specific number of BSs 200a, 202a and MSs 204 are shown, FIG. 2 is an example and any numbers of BSs and MSs may be provided. Furthermore, the operations provided by one or more devices of system may be combined, substituted, or re-allocated among various devices.

The BSs 200a, 202a may include any of a number of different types of apparatuses such as, for example, a node B or eNB (e.g., macro eNB-MeNB), a base transceiver system (BTS), an access point, a home BS, node B or eNB (e.g., home eNB-HeNB), or the like. In other exemplary embodiments, the BS may be a relay station, an intermediate node, or an intermediary. The BS may include any appropriate type of wireless or radio BS, such as a land-based communication BS or a satellite-based communication BS. The BS may include any appropriate type voice, data, and/or integrated voice and data communication equipment to provide high speed data and/or voice communications. In other exemplary embodiments, any other type of BS or equivalent thereof may be used.

The MS 204 may be any type of device for communicating with a BS 200a, 202a. For example, an MS may be a mobile communication device, or any other appropriate computing platform or device capable of exchanging data and/or voice information with a BS such as servers, clients, desktop computers, laptop computers, network computers, workstations, personal digital assistants (PDA), tablet PCs, scanners, telephony devices, pagers, cameras, musical devices, etc. An MS may be a fixed computing device operating in a mobile environment, such as, for example, a bus, a train, an airplane, a boat, a car, etc. In some embodiments, an MS may be configured to communicate with a BS using any of the various communication standards supporting mobile communication devices. The MSs may be configured to communicate with other MSs (not shown) directly or indirectly via a BS or computing systems (not shown) using wired or wireless communication methods.

FIG. 3 illustrates a block diagram of an apparatus 300 that may be configured to operate as a BS 200a, 202a or MS 204, in accordance with example embodiments. As shown, apparatus may include one or more of the following components: at least one processor 302 configured to execute computer readable instructions to perform various processes and methods, at least one memory 304 configured to access and store information and computer readable instructions, at least one database 306 to store tables, lists or other data structures, at least one I/O device 308, at least one interface 310, at least one antenna 312 and/or at least one transceiver 314.

The processor 302 may include a general purpose processor, application specific integrated circuit (ASIC), embedded processor, field programmable gate array (FPGA), microcontroller, or other like device. The processor may be configured to act upon instructions and data to process data output from transceiver 314, I/O devices 308, interfaces 310 or other components that are coupled to processor. In some exemplary embodiments, the processor may be configured to exchange data or commands with the memory 304. For example, the processor may be configured to receive computer readable instructions from the memory and perform one or more operations under direction of the respective instructions.

The memory 304 may include a volatile or non-volatile, non-transitory computer-readable storage medium configured to store data as well as software, such as in the form of computer readable instructions. More particularly, for example, the memory may include volatile or non-volatile semiconductor memory devices, magnetic storage, optical storage or the like. The memory may be distributed. That is, portions of the memory may be removable or non-removable. In this regard, other examples of suitable memory include Compact Flash cards (CF cards), Secure Digital cards (SD cards), Multi-Media cards (MMC cards) or Memory Stick cards (MS cards) or the like. In some exemplary embodiments, the memory may be implemented in a network (not shown) configured to communicate with the apparatus 300.

The database 306 may include a structured collection of tables, lists or other data structures. For example, the database may be a database management system (DBMS), a relational database management system, an object-oriented database management system or similar database system. As such, the structure may be organized as a relational database or an object-oriented database. In other exemplary embodiments, the database may be a hardware system including physical computer-readable storage media and input and/or output devices configured to receive and provide access to tables, lists, or other data structures. Further, hardware system database may include one or more processors and/or displays.

The I/O devices 308 include any one or more of a mouse, stylus, keyboard, audio input/output device, imaging device, printing device, display device, sensor, wireless transceiver or other similar device. The I/O devices may also include devices that provide data and instructions to the memory 304 and/or processor 302.

The interfaces 310 may include external interface ports, such as USB, Ethernet, FireWire®, and wireless communication protocols. The interfaces may also include a graphical user interface, or other humanly perceivable interfaces configured to present data, including but not limited to, a portable media device, traditional mobile phone, smart phone, navigation device, or other computing device. The apparatus 300 may be operatively connected to a network (not shown) via a wired and/or wireless communications link using the interface.

The transceiver 314 may include any appropriate type of transmitter and receiver to transmit and receive voice and/or data from other apparatuses (e.g., BS 200a, 202a, MS 204). In some exemplary embodiments, the transceiver may include one or a combination of desired functional component(s) and processor(s) to encode/decode, modulate/demodulate and/or perform other wireless communication-channel-related operations. The transceiver 314 may be configured to communicate with an antenna 312 (e.g., single antenna or antenna array) to transmit and receive voice and/or data in one of various transmission modes.

Generally, in accordance with various exemplary embodiments, the BS 200a of the first radio access network 200 implementing the first radio access technology (e.g., IEEE 802.16, 802.16m) may format data in a number of different frame structures for transmission to one or more MSs 204. In this regard, the base station may configure its sampling points to format and transmit data in the respective frame structure. The BS may broadcast its frame structure to acknowledge to an MS that there exist different frame structures or a frame structure with different cyclic prefixes. An MS, in turn, may read a superframe header or broadcast channel that carries system information. The MS may then acquire the frame structure and adjust the associated cyclic prefix.

Example embodiments of the present disclosure may extend IEEE 802.16m designs such as midamble, sounding, pilot patterns, subframes (e.g., type-1 AAI subframe, type-2 AAI subframe, type-3 AAI subframe), carrier spacing or the like. Based on the new frame structure of example embodiments, a first radio access network 200 implementing the first radio access technology such as IEEE 802.16 may co-exist with at least one second radio access network 102 implementing at least one second, different radio access technology such as TD-SCDMA, TD-LTE or the like. In one example, co-existence may refer to aligning the switching points between uplink and downlink transmission to/from BSs 200a, 202a implementing the different radio access technologies so as to avoid simultaneous (or overlap in) uplink and downlink transmission between the respective BSs.

Without loss of generality, exemplary embodiments of the present disclosure may be provided herein with reference to numerology specified by IEEE 802.16m, TD-SCDMA and TD-LTE. IEEE 802.16m specifies three different carrier spacing, namely 7.81 KHz, 9.77 KHz and 10.9 KHz for 7 MHz, 8.75 MHz and 5/10/20 MHz, respectively. As 10.9 KHz is currently used more frequently, example embodiments will be described with reference to it—although example embodiments may instead be applicable to other spacing.

When using 10.9 KHz carrier spacing, the OFDMA symbol durations (lengths) may be 102.857 μs, 97.143 μs and 114.286 μs with 1/8, 1/16 and 1/4 cyclic prefix ratios (ratio of the cyclic prefix to the duration of the symbol before cyclic extension), respectively. The time duration of the cyclic prefixes may be 11.439 μs, 5.714 μs and 22.857 μs for the 1/8, 1/16 and 1/4 cyclic prefix ratios, respectively. If an 11.2 MHz sampling (chip) rate is used, the OFDMA symbol durations may be 1152 points (pts), 1088 pts and 1280 pts for 1/8, 1/16 and 1/4 cyclic prefix ratios, respectively. Exemplary embodiments will be described with respect to the 1/8 and 1/16 cyclic prefix ratios, but it should again be understood that the 1/4 ratio may also be applicable to exemplary embodiments.

As shown in FIG. 4, TD-SCDMA may apply a 5 ms frame structure composed of 7 slots, and includes Downlink Pilot Time Slot (DwPTS), Uplink Pilot Time Slot (UpPTS) and guard period (GP). Each slot may occupy 675 μs (864 chips), the DwPTS may occupy 75 μs (96 chips), the GP may occupy 75 μs (96 chips) and the UpPTS may occupy 125 μs (160 chips). The sampling rate may be 1.28 MHz.

TD-SCDMA has symmetric DL/UL allocation and asymmetric DL/UL allocation. For the symmetric case, there may be 4 slots in the downlink and 3 slots in the uplink, e.g., 2775 μs in the DL and 2150 μs in the UL. For the asymmetric case, there may be 5 slots in the downlink and 2 slots in the uplink, e.g., 3450 μs in the DL and 1475 μs in the UL.

FIGS. 5 and 6 illustrate two exemplary frame structures for TD-LTE. TD-LTE may apply a 10 ms frame structure composed of 10 subframes in 1 ms. In general, each subframe may be composed of 14 or 12 OFDM or OFDMA symbols depending on the type of cyclic prefix used. A special subframe may be composed of a Downlink Pilot Time Slot (DwPTS), Uplink Pilot Time Slot (UpPTS) and guard period (GP).

TD-LTE specifies two different periodicity, 5 ms and 10 ms. As compared with IEEE 802.16m, the 5 ms TD-LTE frame structure may co-exist with IEEE 802.16m, but conventionally, the 10 ms TD-LTE frame structure may not co-exist with IEEE 802.16m.

Table 1 provides uplink-downlink frame configuration for TD-LTE, including the downlink (D), special subframe (S) and uplink (U) allocations. IEEE 802.16m may co-exist with TD-LTE configurations 0, 1 and 2 using the 5 ms periodicity, but conventionally does not co-exist with TD-LTE configurations 3, 4, 5 and 6. Exemplary embodiments may therefore provide an IEEE 802.16m frame structure that may co-exist with TD-LTE configurations 0, 1 and 2.

TABLE 1

Uplink-downlink frame configuration for TD-LTE

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The following Tables 2 and 3 show the special subframe configuration for TD-LTE (NCP referring to normal cyclic prefix, and ECP referring to extended cyclic prefix).

TABLE 2

Special subframe configuration for TD-LTE with normal cyclic prefix in the downlink

| Special subframe configuration | Normal cyclic prefix (NCP) in the downlink | | | | |
|---|---|---|---|---|---|
| | DwPTS | GP (NCP) | UpPTS (NCP in UL) | GP (ECP) | UpPTS (ECP in UL) |
| 0 | 215.21 μs | 713.23 μs | 71.56 μs | 701.22 μs | 83.57 μs |
| 1 | 645.12 μs | 283.32 μs | | 271.31 μs | |
| 2 | 716.68 μs | 211.76 μs | | 199.75 μs | |
| 3 | 797.06 μs | 131.38 μs | | 119.37 μs | |
| 4 | 859.81 μs | 68.63 μs | | 56.62 μs | |
| 5 | 215.21 μs | 641.66 μs | 143.13 μs | 617.63 μs | 167.16 μs |
| 6 | 645.12 μs | 211.75 μs | | 187.72 μs | |
| 7 | 716.68 μs | 140.19 μs | | 116.16 μs | |
| 8 | 788.25 μs | 68.62 μs | | 44.59 μs | |

TABLE 3

Special subframe configuration for TD-LTE with extended cyclic prefix in the downlink

| Special subframe configuration | Extended cyclic prefix (ECP) in the downlink | | |
|---|---|---|---|
| | DwPTS | UpPTS (NCP in UL) | UpPTS (ECP in UL) |
| 0 | 250 μs | 71.35 μs | 83.33 μs |
| 1 | 666.67 μs | | |
| 2 | 750 μs | | |
| 3 | 833.33 μs | | |
| 4 | 250 μs | 142.71 μs | 166.67 μs |
| 5 | 666.67 μs | | |
| 6 | 750 μs | | |
| 7 | — | — | — |
| 8 | — | — | — |

Based on configurations 0, 1 and 2, and special subframe configuration, the following values for downlink duration (length) and uplink duration may be stated for these combinations.

TABLE 4

Downlink and uplink duration for TD-LTE configuration 0 with normal cyclic prefix in the downlink Normal cyclic prefix in the downlink

| Special subframe configuration | Downlink | GP (NCP) | Uplink (NCP in UL) | GP (ECP) | Uplink (ECP in UL) |
|---|---|---|---|---|---|
| 0 | 1215.21 μs | 713.23 μs | 3071.56 μs | 701.22 μs | 3083.57 μs |
| 1 | 1645.12 μs | 283.32 μs | | 271.31 μs | |
| 2 | 1716.68 μs | 211.76 μs | | 199.75 μs | |
| 3 | 1797.06 μs | 131.38 μs | | 119.37 μs | |
| 4 | 1859.81 μs | 68.63 μs | | 56.62 μs | |
| 5 | 1215.21 μs | 641.66 μs | 3143.13 μs | 617.63 μs | 3167.16 μs |
| 6 | 1645.12 μs | 211.75 μs | | 187.72 μs | |
| 7 | 1716.68 μs | 140.19 μs | | 116.16 μs | |
| 8 | 1788.25 μs | 68.62 μs | | 44.59 μs | |

TABLE 5

Downlink and uplink duration for TD-LTE configuration 1 with normal cyclic prefix in the downlink Normal cyclic prefix in the downlink

| Special subframe configuration | Downlink | GP (NCP) | Uplink (NCP in UL) | GP (ECP) | Uplink (ECP in UL) |
|---|---|---|---|---|---|
| 0 | 2215.21 μs | 713.23 μs | 2071.56 μs | 701.22 μs | 2083.57 μs |
| 1 | 2645.12 μs | 283.32 μs | | 271.31 μs | |
| 2 | 2716.68 μs | 211.76 μs | | 199.75 μs | |
| 3 | 2797.06 μs | 131.38 μs | | 119.37 μs | |
| 4 | 2859.81 μs | 68.63 μs | | 56.62 μs | |
| 5 | 2215.21 μs | 641.66 μs | 2143.13 μs | 617.63 μs | 2167.16 μs |
| 6 | 2645.12 μs | 211.75 μs | | 187.72 μs | |
| 7 | 2716.68 μs | 140.19 μs | | 116.16 μs | |
| 8 | 2788.25 μs | 68.62 μs | | 44.59 μs | |

TABLE 6

Downlink and uplink duration for TD-LTE configuration 2 with normal cyclic prefix in the downlink Normal cyclic prefix in the downlink

| Special subframe configuration | Downlink | GP (NCP) | Uplink (NCP in UL) | GP (ECP) | Uplink (ECP in UL) |
|---|---|---|---|---|---|
| 0 | 3215.21 μs | 713.23 μs | 1071.56 μs | 701.22 μs | 1083.57 μs |
| 1 | 3645.12 μs | 283.32 μs | | 271.31 μs | |
| 2 | 3716.68 μs | 211.76 μs | | 199.75 μs | |
| 3 | 3797.06 μs | 131.38 μs | | 119.37 μs | |
| 4 | 3859.81 μs | 68.63 μs | | 56.62 μs | |
| 5 | 3215.21 μs | 641.66 μs | 1143.13 μs | 617.63 μs | 1167.16 μs |
| 6 | 3645.12 μs | 211.75 μs | | 187.72 μs | |
| 7 | 3716.68 μs | 140.19 μs | | 116.16 μs | |
| 8 | 3788.25 μs | 68.62 μs | | 44.59 μs | |

TABLE 7

Downlink and uplink duration for TD-LTE configuration
0 with extended cyclic prefix in the downlink

| Special subframe configuration | Extended cyclic prefix (ECP) in the downlink | | |
|---|---|---|---|
| | Downlink | Uplink (NCP in UL) | Uplink (ECP in UL) |
| 0 | 1250 µs | 3071.35 µs | 3083.33 µs |
| 1 | 1666.67 µs | | |
| 2 | 1750 µs | | |
| 3 | 1833.33 µs | | |
| 4 | 1250 µs | 3142.71 µs | 3166.67 µs |
| 5 | 1666.67 µs | | |
| 6 | 1750 µs | | |

TABLE 8

Downlink and uplink duration for TD-LTE configuration
1 with extended cyclic prefix in the downlink

| Special subframe configuration | Extended cyclic prefix in the downlink | | |
|---|---|---|---|
| | Downlink | Uplink (NCP in UL) | Uplink (ECP in UL) |
| 0 | 2250 µs | 2071.35 µs | 2083.33 µs |
| 1 | 2666.67 µs | | |
| 2 | 2750 µs | | |
| 3 | 2833.33 µs | | |
| 4 | 2250 µs | 2142.71 µs | 2166.67 µs |
| 5 | 2666.67 µs | | |
| 6 | 2750 µs | | |

TABLE 9

Downlink and uplink duration for TD-LTE configuration
2 with extended cyclic prefix in the downlink

| Special subframe configuration | Extended cyclic prefix in the downlink | | |
|---|---|---|---|
| | Downlink | Uplink (NCP in UL) | Uplink (ECP in UL) |
| 0 | 3250 µs | 1071.35 µs | 1083.33 µs |
| 1 | 3666.67 µs | | |
| 2 | 3750 µs | | |
| 3 | 3833.33 µs | | |
| 4 | 3250 µs | 1142.71 µs | 1166.67 µs |
| 5 | 3666.67 µs | | |
| 6 | 3750 µs | | |

A radio access network implementing a radio access technology that employs the OFDMA modulation scheme may apply OFDM modulation to reduce receiver complexity. OFDM modulation, in turn, may apply a cyclic prefix to overcome inter-symbol interference under limited receiver complexity. If the multi-path delay is not longer than the length (duration) of cyclic prefix, a receiver may apply a frequency domain one-tap equalizer to overcome the channel effect. FIG. 7 illustrates an exemplary OFDM symbol in which the cyclic prefix is copied from the tail.

Since a radio access technology employing OFDMA may rely on a cyclic prefix to overcome the multi-path effect, such a radio access technology may set up a large cyclic prefix for a large cell and a small cyclic prefix for a smaller picocell or femtocell to reduce overhead. If a radio access technology has more options for cyclic prefix, the radio access technology may support more types of system coverage. FIG. 8 illustrates two OFDM symbols of a radio access technology employing OFDMA. Short cyclic prefix (CP) and long cyclic prefix may support two types of network ranges. In IEEE 802.16m, at least three types of cyclic prefixes may be supported, e.g., 1/4 CP ratio, 1/8 CP ratio and 1/16 CP ratio.

More cyclic prefix options belonging to the radio access technology may introduce higher complexity for a receiver. When a receiver accesses a system including a radio access network implementing a radio access technology that employs OFDMA, the receiver may not have prior knowledge of the cyclic prefix, but may instead detect the preamble and estimate the cyclic prefix by the preamble. Based on the estimated cyclic prefix, the receiver may detect the following OFDM symbols to acquire system information. The receiver may also blindly decode the following OFDM symbols based on all possible cyclic prefixes. If the receiver can correctly decode these OFDM symbols, the cyclic prefix used for decoding may be the cyclic prefix used in this system. However, cyclic prefix detection may be unreliable and may require high complexity especially for network entry. If there are many options, high complexity may be imposed on the receiver. When some options of cyclic prefix are very close, error detection probability may be high. A radio access technology employing OFDMA should reduce the options of cyclic prefixes as much as possible.

There may some purposes to allocate a different size of cyclic prefix. One example of a suitable purpose is for the co-existence of WiMAX (or IEEE 802.16m) and TD-LTE. In order to align the timing between both radio access technologies, different cyclic prefixes may be applied for WiMAX to align timing as shown in FIG. 9. In this case, there may be many types of cyclic prefixes due to a large number of TD-LTE frame configurations, and a mobile station may detect the cyclic prefix. FIG. 10 illustrates an exemplary frame structure including a different frame structure on two carriers. A receiver may detect both radio access technologies with different cyclic prefixes, but this may increase receiver complexity. In order to reduce the detection complexity, some sophisticated design may be desirable.

I. Approach 1: Cyclic Prefix and Frame Structure Adjustment

According to one exemplary embodiment, the DL and UL timing may be adjusted by shortening the cyclic prefix as shown in FIG. 11, by reducing the number of subframes as shown in FIG. 12, or by reusing the subframe with a fewer number of OFDMA symbols based on IEEE 802.16m type-1, type-2 and type-3 subframe structures as shown in FIG. 13. IEEE 802.16m defines three types of subframes: a type-1 advanced air interface (AAI) subframe, a type-2 AAI subframe and a type-3 AAI subframe. The type-1 AAI subframe may have 6 OFDMA symbols, the type-2 AAI subframe may have 7 OFDMA symbols, and the type-3 AAI subframe may have 5 OFDMA symbols.

Exemplary embodiments may include a midamble in the downlink between the first and the second frame in an instance in which space exists for at least one additional OFDMA symbol in the downlink. Even further, exemplary embodiments may include a sounding symbol after the last uplink subframe to increase the uplink sounding capacity in an instance in which space exists for at least one additional OFDMA symbol in the uplink.

Based on the aforementioned approach, the downlink duration may be shorter than the TD-SCDMA downlink duration (length), and the uplink duration may be shorter than the TD-SCDMA uplink duration.

Exemplary embodiments may include 7 and 8 subframe structures to adjust timing. For these frame structures, exemplary embodiments propose multiple cyclic prefix aligning methods to adjust the DL and UL timing.

1. All downlink subframes may apply the same cyclic prefix length that may be shortened based on the TD-SCDMA downlink duration, and the remaining uplink subframes may apply a cyclic prefix length selected without regard to the TD-SCDMA downlink duration;

2. All uplink subframes may apply the same cyclic prefix length that may be shortened based on the TD-SCDMA uplink duration, and the remaining uplink subframes may apply a cyclic prefix length selected without regard to the TD-SCDMA uplink duration;

3. All subframes may apply the same cyclic prefix length that may be shortened based on the TD-SCDMA downlink and uplink durations;

4. The first downlink subframe may apply a type-1 subframe with 1/8 CP ratio and a cyclic prefix length selected without regard to the TD-SCDMA downlink duration, and the remaining downlink subframe or uplink subframes may apply the same cyclic prefix that may be shortened based on the TD-SCDMA downlink or uplink durations; and/or, 5. The first downlink subframe may apply a type-1 subframe with 1/16 CP ratio and a cyclic prefix length selected without regard to the TD-SCDMA downlink duration, and the remaining downlink subframe or uplink subframes may apply the same cyclic prefix that may be shortened based on the TD-SCDMA downlink or uplink durations.

A. Symmetric DL/UL Allocation: DL 26 OFDMA Symbols and UL 20 OFDMA Symbols

Various exemplary embodiments may apply symmetric DL/UL allocation. To illustrate this example, consider a DL with 26 OFDMA symbols, and an UL with 20 OFDMA symbols. In the downlink, the frame structure may be composed of two type-1 subframes and two type-2 subframes. The second subframe may use type-2 subframe. The second subframe may send midamble. In the uplink, the fame may be composed of two type-2 subframes and one type-1 subframe.

Figures 14, 15, 16:
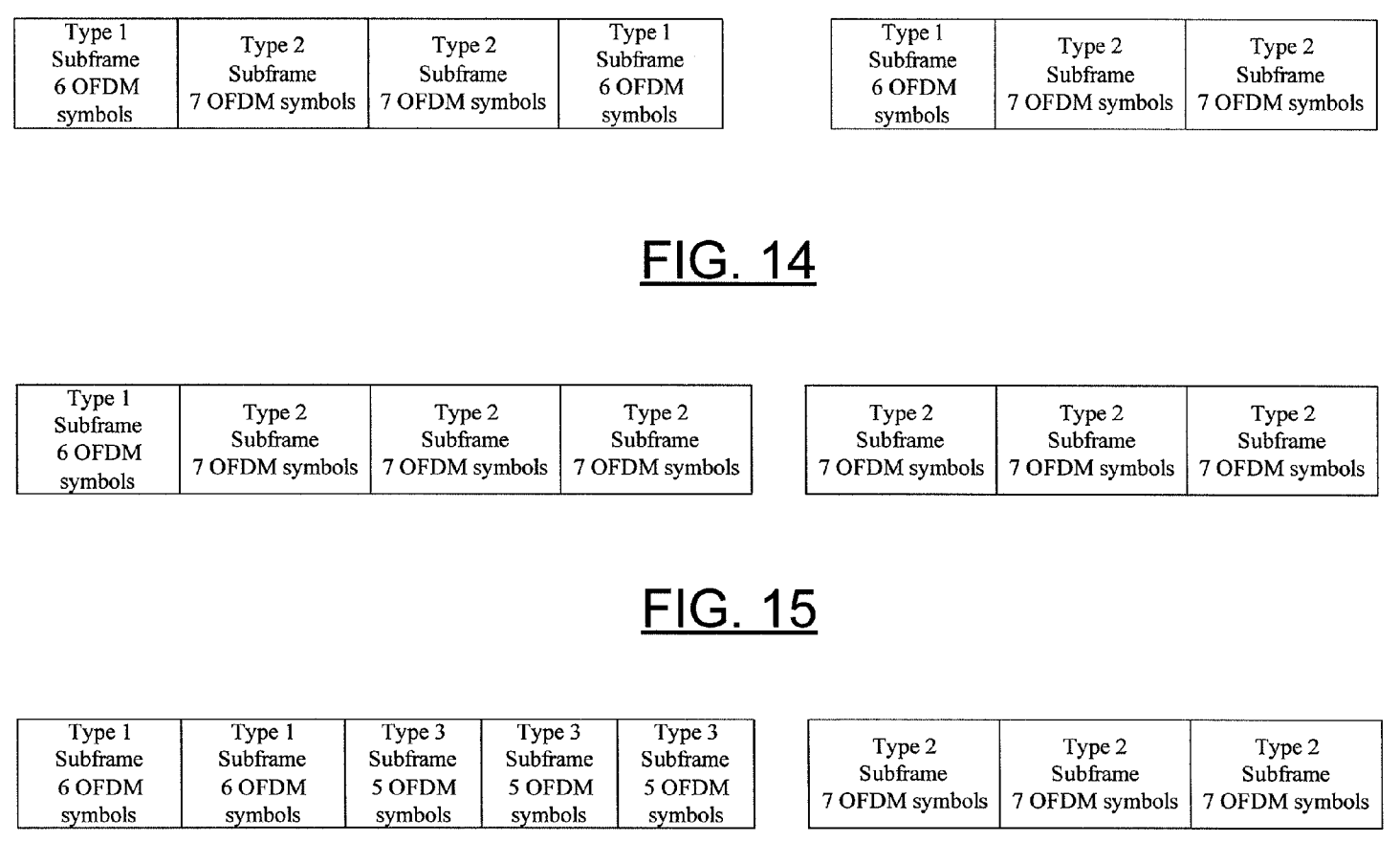

FIG. 14 illustrates an exemplary frame structure according to this exemplary embodiment. As shown, in the downlink, there may be a type-1 subframe, type-2 subframe (midamble), type-2 subframe and type-1 subframe. In the uplink, there may be a type-1 subframe, type-2 subframe and type-2 subframe. In the downlink, all subframes may apply a 1/8 CP ratio, and the transmit transition gap (TTG) may be 173.929 μs. In this regard, the TTG may refer to the gap between a downlink subframe and the next subsequent uplink subframe at a switching point; and similarly, a receive transition gap (RTG) may refer to the gap between an uplink subframe and the next subsequent downlink subframe at a switching point. In the uplink, all subframes may similarly apply a 1/8 CP ratio, and the RTG may be 92.857 μs. Both frame structures may be further aligned with IEEE 802.16m; the TTG may be 206.786 μs and the RTG may be 60 μs.

B. Symmetric DL/UL Allocation with 1/8 CP Ratio: DL 27 OFDMA Symbols and UL 21 OFDMA Symbols Exemplary embodiments may include cyclic prefix shortening to increase the capacity. This example may first introduce the frame structure with cyclic prefix length close to 1/8 CP ratio. In this case, the downlink may have 27 OFDMA symbols, and the uplink may have 21 OFDMA symbols.

B.1. Symmetric DL/UL Allocation: DL 27 OFDMA Symbols and UL 21 OFDMA Symbols and 7 Subframes As shown in FIG. 15, in an instance in which the frame structure has 7 subframes, there may be one type-1 subframe and three type-2 subframes in the downlink, and there may be three type-2 subframes in the uplink. In this case, there may exist several cyclic prefix options.

In the downlink:

1. All subframes may apply equal cyclic prefix (CP) length, which may be up to 11.349 μs for all subframes, and where the TTG may be 75.268 μs;

2. The first subframe may apply a 1/8 CP ratio and use a CP length=11.439 μs, and the remaining subframes may use a shortened cyclic prefix length such as CP length=11.327 μs, where the TTG may be 76.607 μs;

3. All subframes may apply CP length=8.571 μs, where the TTG may be 150 μs;

4. The first subframe may apply CP length=11.439 μs, and the remaining subframes may apply a CP length=8.571 μs, where the TTG may be 132.857 μs;

5. All subframes may apply a CP length=10.952 μs, where the TTG may be 150 μs;

6. The first subframe may apply a CP length=11.439 μs, and the remaining subframes may apply a CP length=10.952 μs, where the TTG may be 84.107 μs;

7. All subframes may apply a CP length=9.732 μs, where the TTG may be 118.661 μs; and/or 8. The first subframe may apply a CP length=11.439 μs, and the remaining subframes may apply a CP length=9.732 μs, where the TTG is 108.482 μs.

In the uplink:

1. All subframes may apply a CP length=10.952 μs, where the RTG may be 1.25 μs;

2. All subframes may apply a CP length=8.571 μs, where the RTG may be 50 μs; and/or 3. All subframes may apply a CP length=9.732 where the RTG may be 25.625 μs.

B.2. Symmetric DL/UL Allocation: DL 27 OFDMA Symbols and UL 21 OFDMA Symbols and 8 Subframes As shown in FIG. 16, in an instance in which the frame structure has 8 subframes, there may be two type-1 subframes and three type-3 subframes in the downlink, and there may be three type-2 subframes in the uplink. In this case, there may exist several cyclic prefix options.

In the downlink:

1. All subframes may apply equal cyclic prefix length, which may be up to CP length=11.349 μs for all subframes, where the TTG may be 75.268 μs;

2. The first subframe may apply a 1/8 CP ratio and use a CP length=11.439, and the remaining subframes may use a shortened cyclic prefix length such as CP length=11.327 μs, where the TTG may be 76.607 μs;

3. All subframes may apply a CP length=8.571 μs, where the TTG may be 150 μs;

4. The first subframe may apply a CP length=11.439 μs, and the remaining subframes may apply a CP length=8.571 μs, where the TTG may be 132.857 μs;

5. All subframes may apply a CP length=10.952 μs, where the TTG may be 150 μs;

6. The first subframe may apply a CP length=11.439 μs, and the remaining subframes may apply a CP length=10.952 μs, where the TTG may be 84.107 μs;

7. All subframes may apply CP length=9.732 μs, where the TTG may be 118.661 μs; and/or 8. The first subframe may apply a CP length=11.439 μs, and the remaining subframes may apply a CP length=9.732 μs, where the TTG may be 108.482 μs.

In the uplink:

1. All subframes may apply CP length=10.952 μs, where the RTG may be 1.25 μs;

2. All subframes may apply CP length=8.571 μs, where the RTG may be 50 μs; and/or 3. All subframes may apply CP length=9.732 μs, where the RTG may be 25.625 μs.

C. Symmetric DL/UL Allocation: DL 28 OFDMA Symbols and UL 22/21 OFDMA Symbols

In this case, the proposed frame structure may be composed of a fewer number of subframes or a subframe may include fewer OFDM symbols.

Figure 17:
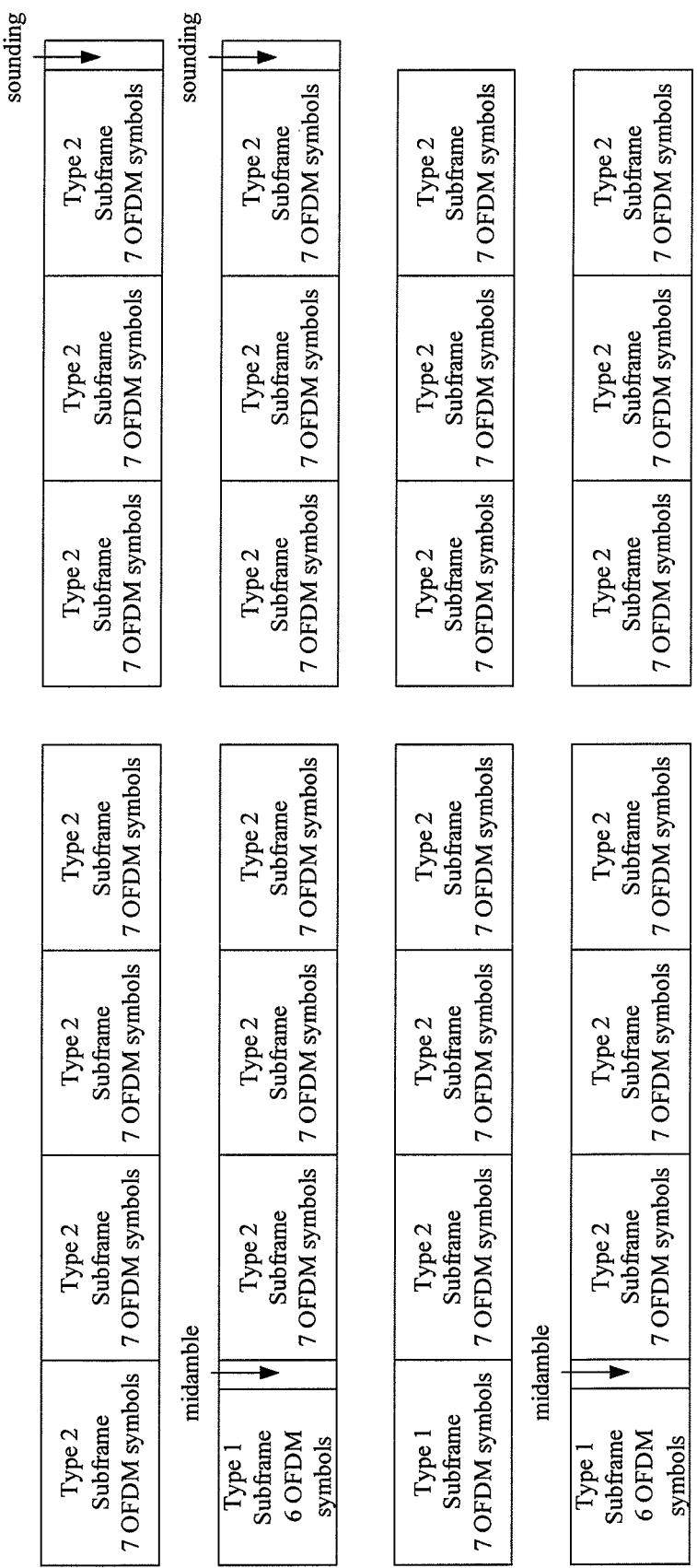

C1. Symmetric DL/UL Allocation: DL 28 OFDMA Symbols and UL 22/21 OFDMA Symbols and 7 Subframes As shown in FIG. 17, in an instance in which the frame structure has 7 subframes, there may be one type-1 subframe and three type-2 subframes, or four type-2 subframes, in the downlink. In an instance in which there is one type-1 subframe and three type-2 subframes in the downlink, a midamble may be inserted between the first and second subframes. In the uplink, there may be three type-2 subframes, and a sounding symbol may be inserted after the last subframe. In this case, there may be have several cyclic prefix options.

In the downlink, and in an instance in which a type-2 subframe is used in the first subframe:

1. All subframes may apply a CP length=5.714 μs, where the TTG may be 130 μs;
2. All subframes may apply up to a CP length=7.679 μs, where the TTG may be at least 75 μs; and/or
3. The first subframe may apply a CP length=5.714 μs, and the remaining subframes may apply a CP length=8.333 μs, where the TTG may be 76.625 μs.

In the downlink, and in an instance in which a type-1 subframe is used in first subframe:

1. All subframes may apply a CP length=5.714 μs, where the TTG may be 130 μs;
2. All subframes may apply up to a CP length=7.679 μs, where the TTG may be at least 75 μs; and/or
3. The first subframe may apply a CP length=5.714 μs, and the remaining subframes and midamble may apply a CP length=8.214 μs, where the TTG may be 75 μs.

In the uplink, and in an instance in which a sounding symbol is appended after the last subframe:

1. All subframes may apply CP length=5.89 μs, where the RTG may be 12.857 μs.

In the uplink, and in an instance in which a sounding symbol is not appended after the last subframe:

1. All subframes may apply CP length=5.89 μs, where the RTG may be 110 μs.

C.2. Symmetric DL/UL Allocation: DL 27 OFDMA Symbols and UL 20 OFDMA Symbols and 8 Subframes As shown in FIG. 18, in an instance in which the frame structure has 8 subframes, there may be three type-1 subframes and two type-3 subframes in the downlink. In the uplink, there may be three type-2 subframes, and a sounding symbol may be inserted after the last subframe. In this case, several cyclic prefix options may exist.

In the downlink:

1. All subframes may apply CP length=5.714 μs, where the TTG may be 130 μs;
2. All subframes may apply up to CP length=7.679 μs, where the TTG may be at least 75 μs; and/or
3. The first subframe may apply a CP length=5.714 μs, and the remaining subframes may apply 8.333 μs, where the TTG may be 76.625 μs.

In the uplink, and in an instance in which a sounding symbol is appended after the last subframe:

1. All subframes may apply CP length=5.89 μs, where the RTG may be 12.857 μs.

In the uplink, and in an instance in which a sounding symbol is not appended after the last subframe:

1. All subframes may apply CP length=5.89 μs, where the RTG may be 110 μs.

D. Asymmetric DL/UL Allocation: DL 33 OFDMA Symbols and UL 14 OFDMA Symbols

D.1. Asymmetric DL/UL Allocation: DL 33 OFDMA Symbols and UL 14 OFDMA Symbols and 7 Subframes Various exemplary embodiments may apply asymmetric DL/UL allocation. There may be 7 subframes, of which the DL may have 35 OFDMA symbols and the UL may have 14 OFDMA symbols. In the downlink, the frame structure may be composed of two type-1 subframes and three type-2 subframes. The second subframe may use type-2 subframes. In the uplink, the fame may be composed of two type-2 subframe. FIG. 19 illustrates an example of such a frame structure. In this case, several cyclic prefix options may exist.

In the downlink:

1. All subframes may apply CP length=11.439 μs, where the TTG may be 130.714 μs.

In the uplink:

1. All subframes may apply CP length=11.439 μs, where the RTG may be 35 μs.

D.2. Asymmetric DL/UL Allocation: DL 33 OFDMA Symbols and UL 14 OFDMA Symbols and 8 Subframes In this example of asymmetric DL/UL allocation there may be 8 subframes, of which the DL may have 35 OFDMA symbols and the UL may have 14 OFDMA symbols. In the downlink, the frame structure may be composed of three type-1 subframes and three type-3 subframes. In the uplink, the fame may be composed of two type-2 subframes. FIG. 20 illustrates an example of frame structure.

In the downlink:

1. All subframes may apply CP length=11.439 μs, where the TTG may be 130.714 μs.

In the uplink:

1. All subframes may apply CP length=11.439 μs, where the RTG may be 35 μs.

E. Asymmetric DL/UL Allocation: DL 34 OFDMA Symbols and UL 15/14 OFDMA Symbols

Other examples of asymmetric DL/UL allocation may be applicable to cases including 7 subframes and 8 subframes.

In an instance in which 7 subframes are applied, there may be one type-1 subframe and four type-2 subframes in the downlink, and there may be two type-2 subframes in the uplink. A sounding symbol may be appended in the uplink after the last subframe.

Figure 21:
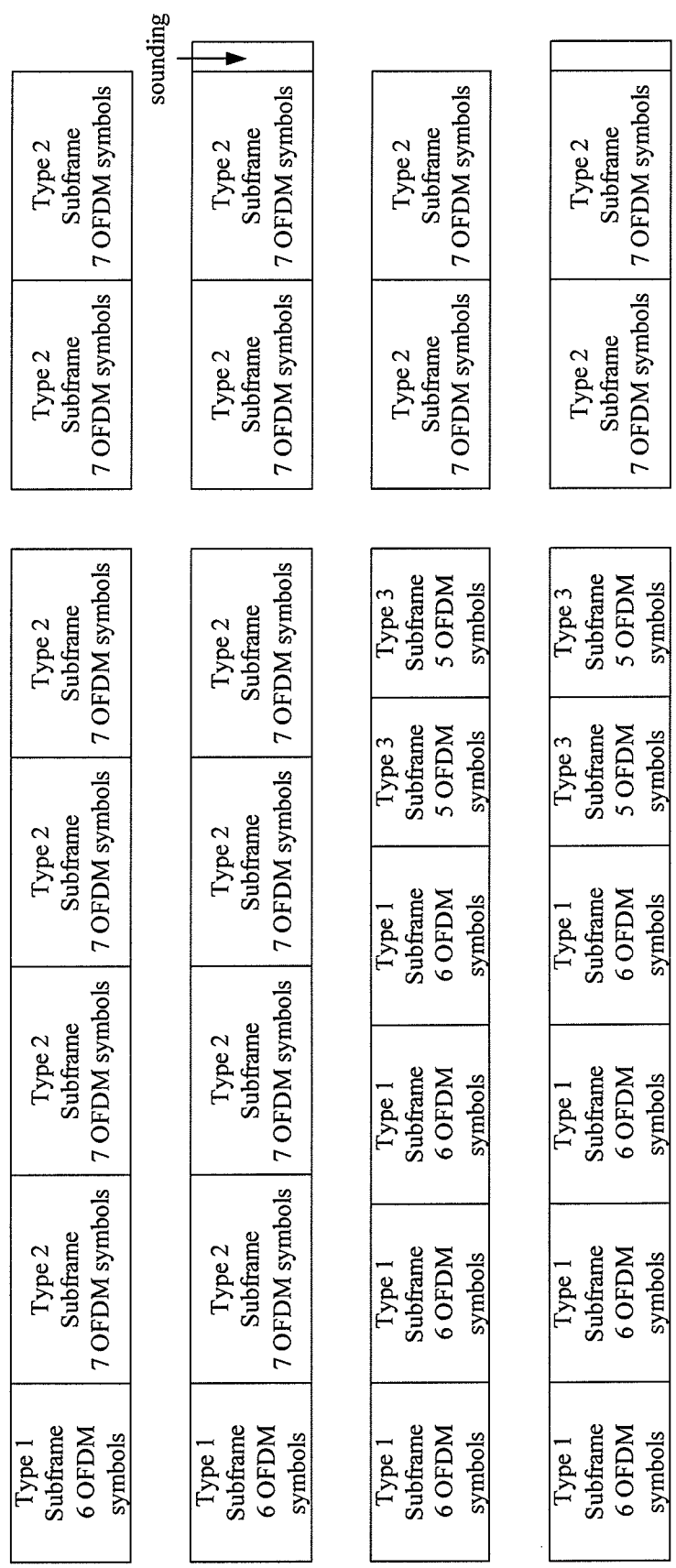

In an instance in which 8 subframes are applied, there may be three type-1 subframe and three type-3 subframes in the downlink, and there may be two type-2 subframes in the uplink. Similar to before, a sounding symbol may be appended in the uplink after the last subframe. FIG. 21 illustrates examples of these frame structures.

E.1. Asymmetric DL/UL Allocation: DL 34 OFDMA Symbols and UL 15/14 OFDMA Symbols and 7 Subframes In this case, several cyclic prefix options may exist.

In the downlink:

1. All subframes may apply equal cyclic prefix length such as a CP length up to CP length=11.349 μs, where the TTG may be 76.429 μs;
2. The first subframe may apply a 1/8 CP ratio and use a CP length=11.439 μs, and the remaining subframes may use a shortened cyclic prefix length such as a CP length=9.732 μs, where the TTG may be 75.357 μs;
3. All subframes may apply CP length=8.571 μs, where the TTG may be 125 μs; and/or
4. The first subframe may apply a CP length=11.439 μs, and the remaining subframes may apply CP length=8.571 μs, where the TTG may be 107.857 μs.

In the uplink, and in an instance in which the uplink includes 15 OFDMA symbols:

1. All subframes may apply CP length=6.875 µs, where the RTG may be 4.464 µs;

In the uplink, and in an instance in which the uplink includes 14 OFDMA symbols:

1. All subframes may apply CP length=11.439 µs, where the RTG may be 35 µs;
2. All subframes may apply CP length=9.732 µs, where the RTG may be 58.75 µs; and/or
3. All subframes may apply CP length=11.349 µs, where the RTG may be 55 µs.

E.2. Asymmetric DL/UL Allocation: DL 34 OFDMA Symbols and UL 15/14 OFDMA Symbols and 8 Subframes In this case, several cyclic prefix options may also exist.

In the downlink:

1. All subframes may apply equal cyclic prefix length such as a CP length up to CP length=11.349 µs, where the TTG may be 76.429 µs;
2. The first subframe may apply a 1/8 CP ratio and use a CP length=11.439, and the remaining subframes may use shortened cyclic prefix length such as a CP length=9.732 µs, where the TTG may be 75.357 µs;
3. All subframes may apply CP length=8.571 µs, where the TTG may be 125 µs; and/or
4. The first subframe may apply a CP length=11.439 µs, and the remaining subframes may apply CP length=8.571 µs, where the TTG may be 107.857 µs.

In the uplink, and in an instance in which the uplink includes 15 OFDMA symbols:

1. All subframes may apply CP length=6.875 µs, where the RTG may be 4.464 µs.

In the uplink, and in an instance in which the uplink includes 14 OFDMA symbols:

1. All subframes may apply CP length=11.439 µs, where the RTG may be 35 µs;
2. All subframes may apply CP length=9.732 µs, where the RTG may be 58.75 µs; and/or
3. All subframes may apply CP length=11.349 µs, where the RTG may be 55 µs.

F. Asymmetric DL/UL Allocation: DL 35 OFDMA Symbols and UL 15/14 OFDMA Symbols

This exemplary embodiment considers an around 1/16 CP ratio for WiMAX. The frame structure of this exemplary embodiment may be composed of a fewer number of subframes or a subframe with a fewer number of OFDMA symbols.

Figure 22:
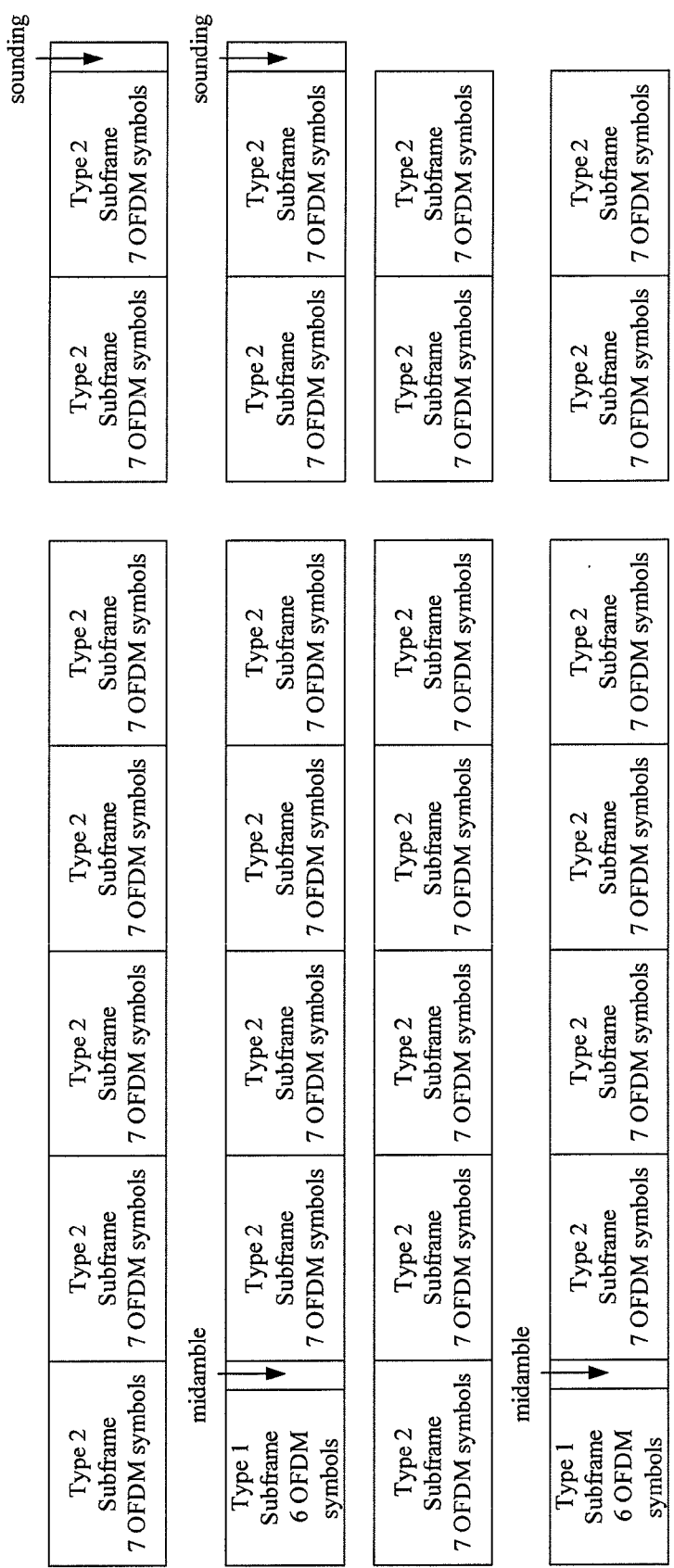

F1. Asymmetric DL/UL Allocation: DL 35 OFDMA Symbols and UL 15/14 OFDMA Symbols and 7 Subframes In the downlink, there may be two types of frame structures. The first type of frame structure may be composed of five type-2 subframes. In the second frame structure, the first subframe may be a type-1 subframe, and the remaining subframes may be type-2 subframes, and a midamble may be inserted between the first and second subframes. And in the uplink, there may be two type-2 subframes, and a sounding symbol may be appended after the last subframe. FIG. 22 illustrates various examples. In these instances, several cyclic prefix options may exist.

In the downlink, and in an instance in which a type-2 subframe is used in the first subframe:

1. All subframes may apply equal cyclic prefix length such as a CP length up to CP length=7.143 µs, where the TTG may be 75 µs;
2. All subframes may apply equal cyclic prefix length such as a CP length up to CP length=5.89 µs, where the TTG may be 125 µs; and/or
3. The first subframe may apply a 1/8 CP ratio and use a CP length such as CP length=5.89 µs, and the remaining subframes may use a shortened cyclic prefix length such as CP length=7.5 µs, where the TTG may be 75 µs.

In the downlink, and in an instance in which a type-1 subframe is used in the first subframe:

1. All subframes may apply equal cyclic prefix length such as a CP length up to CP length=7.143 µs, where the TTG may be 75 µs;
2. All subframes may apply equal cyclic prefix length such as a CP length up to CP length=5.89 µs, where the TTG may be 125 µs; and/or
3. The first subframe may apply a 1/8 CP ratio and use a CP length such as CP length=5.89 µs, and the remaining subframes may use a shortened cyclic prefix length such as CP length=7.411 µs, where the TTG may be 75.804 µs.

In the uplink, and in an instance in which the uplink includes 15 OFDMA symbols:

1. All subframes may apply CP length=6.875 µs, where the RTG may be 4.464 µs; and/or
2. All subframes may apply CP length=5.89 µs, where the RTG may be 16.696 µs.

In the uplink, and in an instance in which the uplink includes 14 OFDMA symbols:

1. All subframes may apply CP length=5.89 µs, where the RTG may be RTG=113.839 µs.

Figure 23:
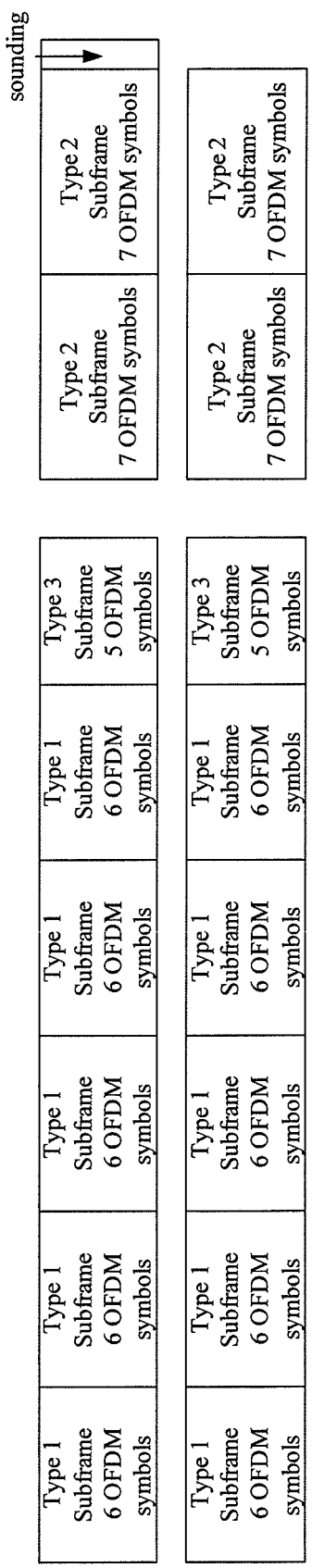

F.2. Asymmetric DL/UL Allocation: DL 35 OFDMA Symbols and UL 15/14 OFDMA Symbols and 8 Subframes In the downlink, there may be five type-1 subframes and one type-3 subframe. In the uplink, there may be two type-2 subframes, and a sounding symbol may be appended after the last subframe. FIG. 23 illustrates examples. In these instances, there may be several prefix options.

In the downlink, and in an instance in which a type-2 subframe is used in the first subframe, and in which the there may be three type-1 subframes and two type-3 subframes in the donwlink:

1. All subframes may apply equal cyclic prefix length such as a CP length up to CP length=7.143 µs, where the TTG may be 75 µs;
2. All subframes may apply equal cyclic prefix length such as a CP length up to CP length=5.89 µs, where the TTG may be 125 µs; and/or
3. The first subframe may apply a 1/8 CP ratio and use a CP length such as CP length=5.89 µs, and the remaining subframes may use a shortened cyclic prefix length such as CP length=7.411 µs, where the TTG may be 75.804 µs.

In the uplink, and in an instance in which the uplink includes 15 OFDMA symbols:

1. All subframes may apply CP length=6.875 µs, where the RTG may be 4.464 µs; and/or
2. All subframes may apply CP length=5.89 µs, where the RTG may be 16.696 µs In the uplink, and in an instance in which the uplink includes 14 OFDMA symbols:

1. All subframes may apply CP length=5.89 µs, where the RTG may be RTG=113.839 µs.

G. TTG and RTG Shifting

In accordance with various example embodiments, the TTG and RTG may be adjusted to shift the timing of the uplink and downlink region to fit other radio access technologies. For example, X µs may be added to the RTG and subtracted from the TTG to align with other radio access technologies.

II. Approach 2: Subframe Adjustment

In IEEE 802.16m, there may exist some constraints for subframe allocation:

1. In the downlink, the first subframe is type-1 subframe;
2. In the downlink, the second subframe can be type-2 subframe;
3. In the downlink, the type-3 subframe will be used in later subframes;
4. In the uplink, the first subframe is type-1 subframe; and
5. In the uplink, the first subframe can use a type-2 subframe to increase capacity of sounding.

FIG. 24 illustrates the timing relationship between TD-LTE and IEEE 802.16m according to one example embodiment. As shown, for the TD-LTE radio access technology, F may refer to the frame duration (length), $D_{LTE}$ may refer to the downlink duration, $U_{LTE}$ may refer to the uplink duration and G may refer to the guard period. In one example, $F=D_{LTE}+U_{LTE}+G=5$ ms. For the IEEE 801.16m radio access technology, $D_{16m}$ may refer to the downlink duration, $U_{16m}$ may refer to the uplink duration and TTG may refer to the transmit transition gap. Also for the IEEE 801.16m radio access technology, RTD may refer to the supported round trip delay, where RTD=2d/c, where d represents the supported distance between mobile station and base station, and c represents the speed of light. In this example, the following three conditions may be defined to support co-existence between TD-LTE and IEEE 802.16m:

1. $D_{LTE}+G/2>D_{16m}+RTD/2$;
2. $U_{LTE}+G/2>U_{16m}+RTD/2$; and
3. RTD<TTG.

The guard period may be larger than the supported round trip delay RTD for the LTE radio access technology; and therefore, the downlink propagation delay (DPD) may be less than or equal to G/2. The timing advance (TA) may also be less than or equal to G/2 in the uplink. As such, in an instance in which the first condition is not satisfied, and the uplink timing advance is G/2 for TD-LTE, the IEEE 802.16m radio access technology may have a high probability of interfering with the TD-LTE radio access technology. The same may be applicable for the second condition. The third condition proscribes that the TTG shall be larger than the RTD for the IEEE 802.16m. If not, the IEEE 802.16m radio access technology does not support such RTD.

To further illustrate example embodiments of the present disclosure, example frame configurations are provided below for the 1/8 and 1/16 CP ratios.

A. 1/8 CP Ratio

Consider, for example, that the maximum supported distance is d=5 km and the RTD is 33.33 μs. In an instance in which TD-LTE configurations 0, 1, and 2 with extend cyclic prefix and normal cyclic prefix in both the downlink and uplink are considered, the allowed OFDM symbols with 1/8 cyclic prefix ratio may be shown as follows for different configuration, e.g., each OFDMA symbol has 1152 samples at 11.2 MHz.

TABLE 10

Allowed OFDM symbols for IEEE 802.16 m to co-exist with TD-LTE configuration 0 with normal cyclic prefix in the downlink

| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
|---|---|---|---|---|
| 0 | 15.12 | 33.17 | 15.06 | 33.23 |
| 1 | 17.21 | 31.08 | 17.15 | 31.14 |
| 2 | 17.56 | 30.73 | 17.50 | 30.79 |
| 3 | 17.95 | 30.34 | 17.89 | 30.40 |
| 4 | 18.25 | 30.03 | 18.19 | 30.09 |
| 5 | 14.77 | 33.52 | 14.65 | 33.63 |
| 6 | 16.86 | 31.43 | 16.74 | 31.54 |
| 7 | 17.21 | 31.08 | 17.09 | 31.19 |
| 8 | 17.56 | 30.73 | 17.44 | 30.85 |

TABLE 11

Allowed OFDM symbols for IEEE 802.16 m to co-exist with TD-LTE configuration 1 with normal cyclic prefix in the downlink

| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
|---|---|---|---|---|
| 0 | 24.84 | 23.45 | 24.78 | 23.50 |
| 1 | 26.93 | 21.36 | 26.87 | 21.41 |
| 2 | 27.28 | 21.01 | 27.22 | 21.07 |
| 3 | 27.67 | 20.62 | 27.61 | 20.68 |
| 4 | 27.98 | 20.31 | 27.92 | 20.37 |
| 5 | 24.49 | 23.79 | 24.38 | 23.91 |
| 6 | 26.58 | 21.70 | 26.47 | 21.82 |
| 7 | 26.93 | 21.36 | 26.81 | 21.47 |
| 8 | 27.28 | 21.01 | 27.16 | 21.12 |

TABLE 12

Allowed OFDM symbols for IEEE 802.16 m to co-exist with TD-LTE configuration 2 with normal cyclic prefix in the downlink

| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
|---|---|---|---|---|
| 0 | 34.56 | 13.72 | 34.51 | 13.78 |
| 1 | 36.65 | 11.63 | 36.60 | 11.69 |
| 2 | 37.00 | 11.29 | 36.94 | 11.34 |
| 3 | 37.39 | 10.89 | 37.33 | 10.95 |
| 4 | 37.70 | 10.59 | 37.64 | 10.65 |
| 5 | 34.22 | 14.07 | 34.10 | 14.19 |
| 6 | 36.31 | 11.98 | 36.19 | 12.10 |
| 7 | 36.65 | 11.63 | 36.54 | 11.75 |
| 8 | 37.00 | 11.29 | 36.88 | 11.40 |

TABLE 13

Allowed OFDM symbols for IEEE 802.16 m to co-exist with TD-LTE configuration 0 with extended cyclic prefix in the downlink

| | Extended cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 15.29 | 33.00 | 15.23 | 33.06 |
| 1 | 17.32 | 30.97 | 17.26 | 31.03 |
| 2 | 17.72 | 30.57 | 17.66 | 30.63 |
| 3 | 18.13 | 30.16 | 18.07 | 30.22 |
| 4 | 14.94 | 33.34 | 14.83 | 33.46 |
| 5 | 16.97 | 31.32 | 16.85 | 31.44 |
| 6 | 17.37 | 30.91 | 17.26 | 31.03 |

TABLE 14

Allowed OFDM symbols for IEEE 802.16 m to co-exist with TD-LTE configuration 1 with extended cyclic prefix in the downlink

| | Extended cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 25.01 | 23.28 | 24.95 | 23.33 |
| 1 | 27.04 | 21.25 | 26.98 | 21.31 |
| 2 | 27.44 | 20.84 | 27.38 | 20.90 |
| 3 | 27.85 | 20.44 | 27.79 | 20.50 |
| 4 | 24.67 | 23.62 | 24.55 | 23.74 |
| 5 | 26.69 | 21.60 | 26.57 | 21.71 |
| 6 | 27.10 | 21.19 | 26.98 | 21.31 |

TABLE 15

Allowed OFDM symbols for IEEE 802.16 m to co-exist with TD-LTE configuration 2 with extended cyclic prefix in the downlink

| | Extended cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 34.73 | 13.55 | 34.68 | 13.61 |
| 1 | 36.76 | 11.53 | 36.70 | 11.59 |
| 2 | 37.16 | 11.12 | 37.11 | 11.18 |
| 3 | 37.57 | 10.72 | 37.51 | 10.78 |
| 4 | 34.39 | 13.90 | 34.27 | 14.02 |
| 5 | 36.41 | 11.87 | 36.30 | 11.99 |
| 6 | 36.82 | 11.47 | 36.70 | 11.59 |

Based on the aforementioned values, some configurations emerge in the following. In the following, the expression [A]:[B] may denote the DL OFDM symbols : UL OFDM symbols with 1/8 cyclic prefix ratio defined in IEEE 802.16m. And the values 5, 6 and 7 may *denote the type-*3 subframe and the type-1 subframe *and the type-*2 subframe, respectively.

For Configuration 0, the following configurations may be implemented to co-exist with TD-LTE: 14 (13):33, 17:30, 17:31, 18:30 and 15:33. For 14(33):33, the configuration may be as DL: 6:7 and UL: 6, 6, 6, 5, 5, 5. For 17:30, the configuration may be as DL: 6:6:5 and UL: 6, 6, 6, 6, 6. For 17:31, the configuration may be as DL: 6:6:5 and UL: 6, 6, 6, 6, 7. For 18:30, the configuration may be as DL: 6:6:6 and UL: 6, 6, 6, 6, 6.

For Configuration 1, the following configurations may be implemented: 24:23, 26:21(20), 27:20, 27:21(20) and 25:23. For 24:23, the configuration may be as DL: 6, 6, 6, 6 and UL: 6, 6, 6, 5. For 26:21(20), the configuration may be as DL: 6, 5, 5, 5, 5 and UL: 7, 7, 7 (6, 7, 7). For 27:20, the configuration may be as DL: 6, 6, 6, 5, 5 and UL: 6, 7, 7. For 27:21 (20), the configuration may be as DL: 6, 6, 6, 5, 5 and UL: 7, 7, 7 (6, 7, 7). And for 25:23, the configuration may be as DL: 6, 7, 6, 6 and UL: 6, 6, 6, 5.

For Configuration 2, the following configurations may be implemented: 34:14 (13), 34:13, 36:12, 37:10, 37:11 and 36:11. For 34:14 (13), the configuration may be as DL: 6, 6, 6, 6, 5, 5 and UL: 7,7 (6,7). For 34:13, the configuration may be as DL: 6, 6, 6, 6, 5, 5 and UL: 6, 7. And for 36:12, the configuration may be as DL: 6, 6, 6, 6, 6, 6 and UL: 6, 6.

In Table 16 below, two example frame configurations with exact TTG and RTG are provided.

TABLE 16

Frame Configuration for ⅛ CP Ratio

| D:U | AAI subframe Type | | | | | | | | TTG/RTG (µs) |
|---|---|---|---|---|---|---|---|---|---|
| | #0 | #1 | #2 | #3 | #4 | #5 | #6 | #7 | |
| 6:2 | DL | DL | DL | DL | DL | DL | UL | UL | 105.714/ |
| | Type1 | Type1 | Type1 | Type1 | Type3 | Type3 | Type1 | Type2 | 60 |
| 5:3 | DL | DL | DL | DL | UL | UL | UL | | 105.714/ |
| | Type1 | Type1 | Type3 | Type3 | Type3 | Type1 | Type2 | Type2 | 60 |

B. 1/16 CP Ratio

As before, consider, for example, that the maximum supported distance is 5 km and the RTD is 33.33 µs. In an instance in which TD-LTE configurations 0, 1, and 2 with extend cyclic prefix and normal cyclic prefix in both the downlink and uplink are considered, the allowed OFDM symbols with 1/16 cyclic prefix ratio may be shown as follows for different configuration, e.g., each OFDMA symbol has 1088 samples at 11.2 MHz.

TABLE 17

Allowed OFDM symbols for IEEE 802.16 m to co-exist with TD-LTE configuration 0 with normal cyclic prefix in the downlink

| | Normal cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 16.01 | 35.12 | 15.95 | 35.18 |
| 1 | 18.22 | 32.91 | 18.16 | 32.97 |
| 2 | 18.59 | 32.54 | 18.53 | 32.60 |
| 3 | 19.00 | 32.12 | 18.94 | 32.19 |
| 4 | 19.33 | 31.80 | 19.26 | 31.86 |
| 5 | 15.64 | 35.49 | 15.52 | 35.61 |
| 6 | 17.85 | 33.27 | 17.73 | 33.40 |
| 7 | 18.22 | 32.91 | 18.10 | 33.03 |
| 8 | 18.59 | 32.54 | 18.47 | 32.66 |

TABLE 18

Allowed OFDM symbols for IEEE 802.16 m to co-exist with TD-LTE configuration 1 with normal cyclic prefix in the downlink

| | Normal cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 26.30 | 24.82 | 26.24 | 24.89 |
| 1 | 28.52 | 22.61 | 28.45 | 22.67 |
| 2 | 28.88 | 22.24 | 28.82 | 22.31 |
| 3 | 29.30 | 21.83 | 29.24 | 21.89 |
| 4 | 29.62 | 21.51 | 29.56 | 21.57 |
| 5 | 25.93 | 25.19 | 25.81 | 25.32 |
| 6 | 28.15 | 22.98 | 28.02 | 23.10 |
| 7 | 28.52 | 22.61 | 28.39 | 22.74 |
| 8 | 28.88 | 22.24 | 28.76 | 22.37 |

TABLE 19

Allowed OFDM symbols for IEEE 802.16 m to co-exist with TD-LTE configuration 2 with normal cyclic prefix in the downlink

| | Normal cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 36.60 | 14.53 | 36.54 | 14.59 |
| 1 | 38.81 | 12.32 | 38.75 | 12.38 |
| 2 | 39.18 | 11.95 | 39.12 | 12.01 |
| 3 | 39.59 | 11.54 | 39.53 | 11.60 |
| 4 | 39.92 | 11.21 | 39.85 | 11.27 |
| 5 | 36.23 | 14.90 | 36.11 | 15.02 |
| 6 | 38.44 | 12.69 | 38.32 | 12.81 |

TABLE 19-continued

Allowed OFDM symbols for IEEE 802.16 m to co-exist with TD-LTE configuration 2 with normal cyclic prefix in the downlink

| | Normal cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 7 | 38.81 | 12.32 | 38.69 | 12.44 |
| 8 | 39.18 | 11.95 | 39.05 | 12.07 |

TABLE 20

Allowed OFDM symbols for IEEE 802.16 m to co-exist with TD-LTE configuration 0 with extended cyclic prefix in the downlink

| | Extended cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 16.19 | 34.94 | 16.13 | 35.00 |
| 1 | 18.33 | 32.79 | 18.27 | 32.86 |
| 2 | 18.76 | 32.36 | 18.70 | 32.43 |
| 3 | 19.19 | 31.94 | 19.13 | 32.00 |
| 4 | 15.82 | 35.31 | 15.70 | 35.43 |
| 5 | 17.97 | 33.16 | 17.84 | 33.28 |
| 6 | 18.40 | 32.73 | 18.27 | 32.86 |

TABLE 21

Allowed OFDM symbols for IEEE 802.16 m to co-exist with TD-LTE configuration 1 with extended cyclic prefix in the downlink

| | Extended cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 26.48 | 24.64 | 26.42 | 24.71 |
| 1 | 28.63 | 22.50 | 28.57 | 22.56 |
| 2 | 29.06 | 22.07 | 29.00 | 22.13 |
| 3 | 29.49 | 21.64 | 29.42 | 21.70 |
| 4 | 26.12 | 25.01 | 25.99 | 25.13 |
| 5 | 28.26 | 22.87 | 28.14 | 22.99 |
| 6 | 28.69 | 22.44 | 28.57 | 22.56 |

TABLE 22

Allowed OFDM symbols for IEEE 802.16 m to co-exist with TD-LTE configuration 0 with extended cyclic prefix in the downlink

| | Extended cyclic prefix in the downlink | | | |
|---|---|---|---|---|
| Special subframe configuration | Allowed DL OFDM Symbols (NCP in UL) | Allowed UL OFDM Symbols (NCP in UL) | Allowed DL OFDM Symbols (ECP in UL) | Allowed UL OFDM Symbols (ECP in UL) |
| 0 | 36.78 | 14.35 | 36.72 | 14.41 |
| 1 | 38.92 | 12.21 | 38.86 | 12.27 |
| 2 | 39.35 | 11.78 | 39.29 | 11.84 |
| 3 | 39.78 | 11.35 | 39.72 | 11.41 |
| 4 | 36.41 | 14.72 | 36.29 | 14.84 |
| 5 | 38.55 | 12.57 | 38.43 | 12.70 |
| 6 | 38.98 | 12.14 | 38.86 | 12.27 |

Based on the aforementioned values, some configurations emerge in the following. As before, in the following, the expression [A]:[B] may denote the DL OFDM symbols : uplink OFDM symbols with 1/16 cyclic prefix ratio defined in IEEE 802.16m. And the values 5, 6, 7 may denote the type-3 subframe, the type-1 subframe and the type-2 subframe, respectively.

For Configuration 0, the following configurations may be implemented to co-exist with TD-LTE: 15:35, 16:35, 18:32, 19:32, 19:31, 17:33 and 18:33. For 18:32, the configuration may be as DL: 6:7:5 and UL: 6, 6, 6, 7, 7 or DL: 6,6,6 and UL: 6, 6, 6, 7, 7. For 19:32, the configuration may be as DL: 6:7:6 and UL: 6, 6, 6, 7, 7. For 19:31, the configuration may be as DL: 6:7:6 and UL: 6, 6, 6, 6, 7. For 17:33, the configuration may be as DL: 6:6:5 and UL: 6, 6, 7, 7, 7. And for 18:33, the configuration may be as DL: 6:7:5 and UL: 6, 7, 7, 7, 6.

For Configuration 1, the following configurations may be implemented: 26:24, 28(27):22, 29:21(20), 29:22(20) and 25:25. For 26:24, the configuration may be as DL: 6, 7, 7, 6 and UL: 6, 6, 6, 6. For 28 (27): 22, the configuration may be as DL: 7, 7, 7, 7 (6, 7, 7, 7) and UL: 6, 6, 5, 5. For 29:21 (20), the configuration may be as DL: 6, 7, 6, 5, 5 and UL: 7, 7, 7 (6, 7, 7). And for 25:25, the configuration may be as DL: 6, 7, 6, 6 and UL: 6, 6, 6, 7.

For Configuration 2, the following configurations may be implemented: 36:14(13), 38:12, 39:11, 36:15 (13) and 39:12. For 36:14 (13), the configuration may be based on the combinations of DL: 6, 6, 6, 6, 6, 6 or DL: 6, 7, 6, 6, 6, 5 and UL: 7, 7 or UL: 6, 7. For 38:12, the configuration may be as DL: 6, 7, 7, 6, 6, 6 and UL: 6, 6. For 39:11, the configuration may be as DL: 6, 7, 7, 7, 6, 6 and UL: 6, 5. For 36:15 (13), the configuration may be as DL: 6, 6, 6, 6, 6, 6 or DL: 6, 7, 6, 6, 6, 5 and UL: 6, 7. And for 39:12, the configuration may be as DL: 6, 7, 7, 7, 6, 6 and UL: 6, 6.

In Table 23 below, six example frame configurations with exact TTG and RTG are provided.

frame structure selected from the plurality of frame structures and the cyclic prefix that may be applied to its subframes. The cyclic prefix applied to the subframes of the selected frame structure may or may not be the same as the cyclic prefix applied to the preamble and superframe header/broadcast channel.

FIG. 25 illustrates an example frame structure in an instance including a superframe header. This frame structure may be composed of seven subframes. The first subframe may carry a preamble and superframe header. In this first subframe, all OFDM symbols may apply the same cyclic prefix. In each of the remaining subframes of the frame structure, the radio access technology may use different cyclic prefixes for the OFDM symbols.

The superframe header/broadcast channel may or may not be immediately behind the preamble. In instances in which the superframe header/broadcast channel is not immediately behind the preamble, it may be a fixed position away from the preamble, and a receiver may decode the superframe header/broadcast channel based on a pre-defined time difference between preamble and superframe header or preamble and broadcast channel. Further, the preamble may be replaced by a synchronization channel as in 3GPP LTE.

Based on this frame structure, a receiver may apply the preamble and superframe header to acquire correct cyclic prefix in the system. FIG. 26 illustrates a flowchart with various operations in a method of detecting the preamble. A receiver may detect the preamble and estimate the length of cyclic prefix in instances in which multiple cyclic prefixes are used in the system. After the cyclic prefix is estimated, the receiver may use the length of the cyclic prefix to decode the superframe or broadcast channel. The receiver may identify from the information carried by the decoded superframe/broadcast channel. The receiver may then detect or otherwise decode the remaining OFDM symbols based on the respective frame structure and cyclic prefix.

TABLE 23

Frame Configuration for 1/16 CP Ratio

| | AAI subframe Type | | | | | | | | TTG/RTG |
|---|---|---|---|---|---|---|---|---|---|
| D:U | #0 | #1 | #2 | #3 | #4 | #5 | #6 | #7 | (µs) |
| 6:2 | DL | DL | DL | DL | DL | DL | UL | UL | 82.853/60 |
| | Type1 | Type2 | Type2 | Type1 | Type1 | Type1 | Type1 | Type1 | |
| 5:3 | DL | DL | DL | DL | DL | UL | UL | UL | 179.996/60 |
| | Type1 | Type2 | Type1 | Type3 | Type3 | Type1 | Type2 | Type2 | |
| 4:4 | DL | DL | DL | DL | UL | UL | UL | UL | 82.853/60 |
| | Type1 | Type2 | Type2 | Type1 | Type1 | Type1 | Type1 | Type1 | |
| 3:5 | DL | DL | DL | UL | UL | UL | UL | UL | 82.853/60 |
| | Type1 | Type1 | Type1 | Type1 | Type1 | Type1 | Type2 | Type2 | |
| 5:3 | DL | DL | DL | DL | DL | UL | UL | UL | 179.996/60 |
| | Type1 | Type1 | Type1 | Type1 | Type3 | Type1 | Type2 | Type2 | |
| 3:5 | DL | DL | DL | UL | UL | UL | UL | UL | 82.853/60 |
| | Type1 | Type7 | Type5 | Type1 | Type1 | Type1 | Type2 | Type2 | |
| 6:2 | DL | DL | DL | DL | DL | DL | UL | UL | 179.996/60 |
| | Type1 | Type2 | Type1 | Type1 | Type1 | Type3 | Type1 | Type2 | |
| 5:3 | DL | DL | DL | DL | DL | UL | UL | UL | 275.139/60 |
| | Type1 | Type2 | Type1 | Type3 | Type3 | Type1 | Type1 | Type2 | |

III. Approach 3: Identical CP Length in First Subframe and CP Indication in Superframe/BCH Example embodiments of the present disclosure may apply identical cyclic prefixes to preambles among a plurality of frame structures having subframes with at least some of which have different cyclic prefixes. In a superframe header in IEEE 802.16m or broadcast channel (BCH) in 3GPP LTE, the same cyclic prefix may be used. This superframe header/broadcast channel may carry information indicating the The receiver may also detect the cyclic prefix based on the detection of the superframe header. In an instance in which a cyclic prefix is used to decode the superframe header and the decoded data is correct, it may be assumed that the cyclic prefix is used.

In an instance in which there is only a cyclic prefix used in the preamble, the receiver may also apply the cyclic prefix to decode superframe header or broadcast channel.

According to one aspect of the disclosure, all or a portion of the system components shown in FIG. 2, including for example the BS 200a, 202a and/or MS 204, may generally operate under control of one or more computer programs. The computer program for performing the methods of example embodiments of the disclosure may include one or more computer-readable program code portions, such as a series of computer instructions, embodied or otherwise stored in a computer-readable storage medium, such as the non-volatile storage medium.

It will be understood that operations of the system components may be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the operations specified herein. These computer program instructions may also be stored in a computer-readable memory that may direct a computer or other programmable apparatus to operation in a particular manner, such that the instructions stored in the computer-readable memory produce an article of manufacture including instruction means which implement the operation specified herein. The computer program instructions may also be loaded onto a computer or other programmable apparatus to cause a series of operations to be performed on the computer or other programmable apparatus to produce a computer-implemented process such that the instructions which execute on the computer or other programmable apparatus implement the operations specified herein.

Accordingly, the specified operations of the system components support combinations of means for performing operations, combinations of operations for performing the specified operations and program instruction means for performing the specified operations. It will also be understood that one or more operations may be implemented by special purpose hardware-based computer systems which perform the specified operations, or combinations of special purpose hardware and computer instructions.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for co-existence between different radio access technologies, the apparatus comprising a processor configured to at least perform or cause the apparatus to at least perform:

preparing for transmission or receiving data from a base station to or at a mobile station, the data being formatted in frames of a first frame structure of a first radio access technology that applies time division duplexing and supports a given round trip delay (RTD) between the base station and mobile station, the first frame structure being composed of subframes allocated to an uplink and subframes allocated to a downlink, the uplink and downlink subframes of the first frame structure having respective durations $U_1$ and $D_1$ and being separated by a transmit transition gap (TTG), wherein one or more of $U_1$, $D_1$ or TTG are selected based on a second frame structure of a second, different radio access technology that applies time division duplexing, the second frame structure also being composed of subframes allocated to an uplink and subframes allocated to a downlink, the uplink and downlink subframes of the second frame structure having respective durations $U_2$ and $D_2$ and being separated by a guard period (G), and wherein one or more of $U_1$, $D_1$ or TTG are selected to satisfy the following conditions:

(a) $D_2+G/2>D_1+RTD/2$; (b) $U_2+G/2>U_1+RTD/2$; and (c) RTD<TTG.

2. The apparatus of claim 1, wherein the first radio access technology is WiMAX, and the second radio access technology is Time Division Synchronous Code-Division Multiple Access (TD-SCDMA) or Time Division Long Term Evolution (TD-LTE).

3. A method for co-existence between different radio access technologies, the method comprising:

preparing for transmission or receiving data from a base station to or at a mobile station, the data being formatted in frames of a first frame structure of a first radio access technology that applies time division duplexing and supports a given round trip delay (RTD) between the base station and mobile station, the first frame structure being composed of subframes allocated to an uplink and subframes allocated to a downlink, the uplink and downlink subframes of the first frame structure having respective durations $U_1$ and $D_1$ and being separated by a transmit transition gap (TTG), wherein one or more of $U_1$, $D_1$ or TTG are selected based on a second frame structure of a second, different radio access technology that applies time division duplexing, the second frame structure also being composed of subframes allocated to an uplink and subframes allocated to a downlink, the uplink and downlink subframes of the second frame structure having respective durations $U_2$ and $D_2$ and being separated by a guard period (G), and wherein one or more of $U_1$, $D_1$ or TTG are selected to satisfy the following conditions:

(a) $D_2+G/2>D_1+RTD/2$; (b) $U_2+G/2>U_1+RTD/2$; and (c) RTD<TTG.

4. The method of claim 3, wherein the first radio access technology is WiMAX, and the second radio access technology is Time Division Synchronous Code-Division Multiple Access (TD-SCDMA) or Time Division Long Term Evolution (TD-LTE).

* * * * *